United States Patent
Liu et al.

(10) Patent No.: US 11,722,426 B2
(45) Date of Patent: Aug. 8, 2023

(54) STAGGERED ACCEPT REQUEST AND FEEDBACK IN SIDELINK NETWORK CODING

(71) Applicant: QUALCOMM Incorporated, San Diego, CA (US)

(72) Inventors: Guangyi Liu, San Diego, CA (US); Gabi Sarkis, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/508,646

(22) Filed: Oct. 22, 2021

(65) Prior Publication Data

US 2023/0125753 A1  Apr. 27, 2023

(51) Int. Cl.
*H04L 47/283* (2022.01)
*H04W 28/02* (2009.01)
*H04L 1/1812* (2023.01)
*H04W 88/04* (2009.01)

(52) U.S. Cl.
CPC .......... *H04L 47/283* (2013.01); *H04L 1/1816* (2013.01); *H04W 28/0231* (2013.01); *H04W 88/04* (2013.01)

(58) Field of Classification Search
CPC ..... H04L 1/1816; H04L 1/1864; H04L 1/189; H04L 1/1896; H04L 47/283; H04W 28/0231; H04W 88/04; H04W 92/18
See application file for complete search history.

(56) References Cited

U.S. PATENT DOCUMENTS

| | | | |
|---|---|---|---|
| 2008/0049718 A1* | 2/2008 | Chindapol | H04B 7/15592 370/351 |
| 2018/0206176 A1* | 7/2018 | Panteleev | H04W 72/542 |
| 2021/0021536 A1* | 1/2021 | Ganesan | H04L 45/20 |
| 2021/0058905 A1* | 2/2021 | Ganesan | H04L 1/1671 |
| 2022/0131657 A1* | 4/2022 | Elshafie | H04B 7/15507 |
| 2022/0287005 A1* | 9/2022 | Huang | H04W 72/02 |

FOREIGN PATENT DOCUMENTS

WO    WO-2021255256 A1 * 12/2021

OTHER PUBLICATIONS

English translation of PCT/EP2021/066651 (Year: 2021).*

* cited by examiner

*Primary Examiner* — Kan Yuen
(74) *Attorney, Agent, or Firm* — Loza & Loza, LLP

(57) ABSTRACT

Aspects relate to techniques for delaying accept request messages for sidelink network coded communication. A network coding device can receive from a transmitting wireless communication device a sidelink transmission including a packet and a network coding request flag requesting the network coding device perform retransmission(s) of the packet. The network coding device can then receive feedback information for the first packet from a receiving wireless communication device that received the packet at a first time. In addition, the network coding device can transmit an accept request message to the transmitting device indicating whether the network coding device accepts performing retransmission(s) of the packet at a second time different than the first time.

27 Claims, 19 Drawing Sheets

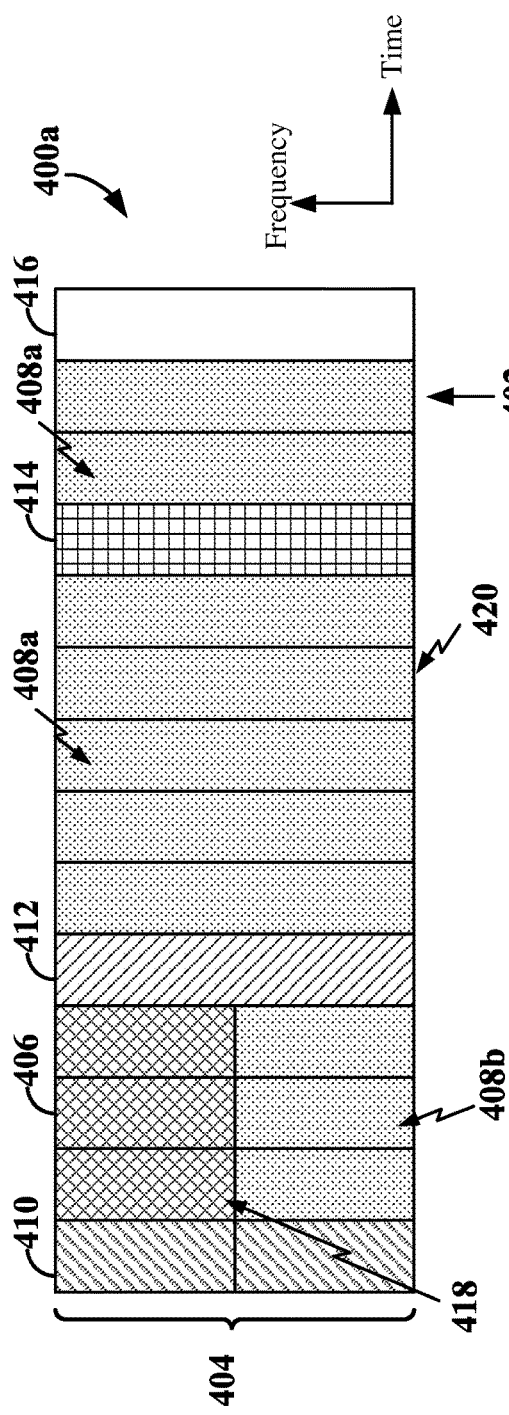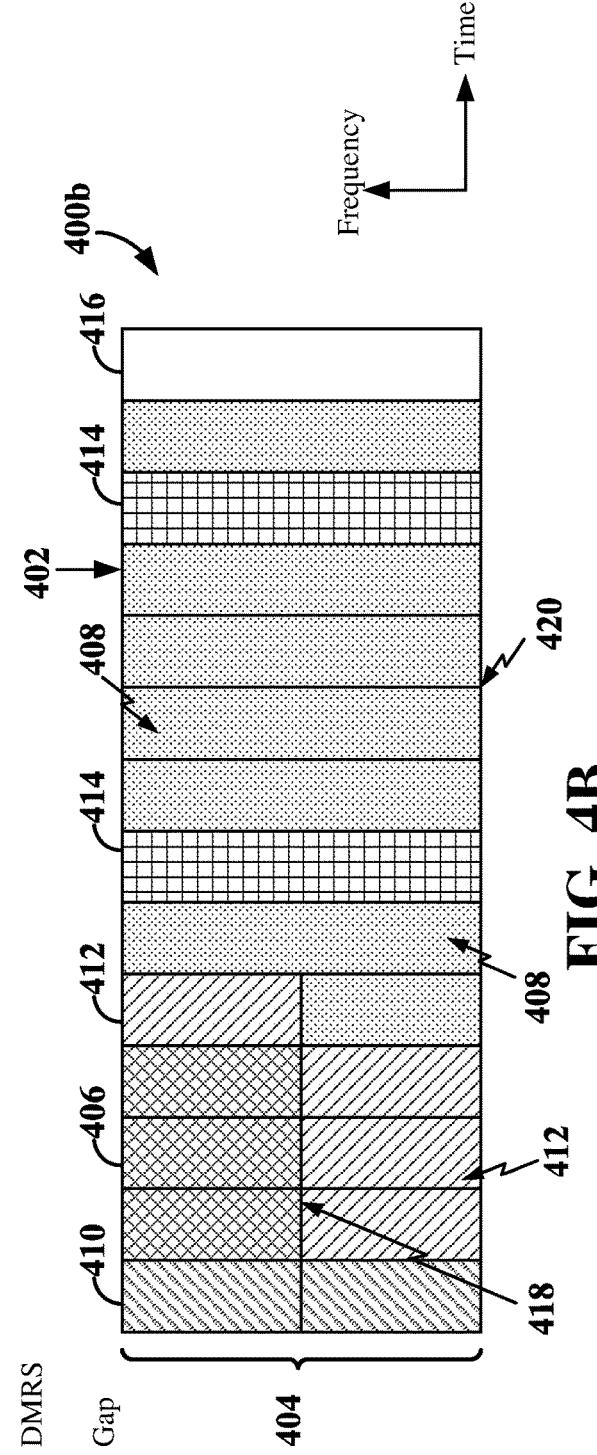
FIG. 4A
FIG. 4B

STAGGERED ACCEPT REQUEST AND FEEDBACK IN SIDELINK NETWORK CODING

TECHNICAL FIELD

The technology discussed below relates generally to wireless communication networks, and more particularly, to network coding in sidelink

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may be transmitted in units of slots in the time domain and in units of sub-channels in the frequency domain Each slot may include both sidelink control information (SCI) and sidelink data traffic. The SCI may be transmitted over a physical sidelink control channel (PSCCH), while the sidelink data traffic may be transmitted over a physical sidelink shared channel (PSSCH) within resources reserved on a sidelink carrier by the SCI. A receiving UE may transmit feedback information, such as hybrid automatic repeat request (HARQ) feedback information including an acknowledgement (ACK) or negative acknowledgement (NACK) of the sidelink data traffic, on a physical sidelink feedback channel (PSFCH). In some examples, there is a mapping between the PSSCH and the corresponding PSFCH resource utilized to transmit the PSFCH.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a network coding device is provided. The network coding device includes a transceiver, a memory, and a processor coupled to the transceiver and the memory. The processor and the memory are configured to receive a first sidelink transmission transmitted from a transmitting wireless communication device to a receiving wireless communication device via the transceiver. The first sidelink transmission includes a first packet and a first network coding request flag requesting the network coding device perform one or more retransmissions of the first packet. The processor and the memory are further configured to receive feedback information for the first packet from the receiving wireless communication device at a first time via the transceiver, and transmit a first accept request message to the transmitting wireless communication device at a second time different than the first time via the transceiver. the first accept request message indicates whether the network coding device accepts performing the one or more retransmissions of the first packet.

Another example provides a method for wireless communication at a network coding device. The method includes receiving a first sidelink transmission transmitted from a transmitting wireless communication device to a receiving wireless communication device. The first sidelink transmission includes a first packet and a first network coding request flag requesting retransmission of the first packet by the network coding device. The method further includes receiving feedback information for the first packet from the receiving wireless communication device at a first time, and transmitting a first accept request message to the transmitting wireless communication device at a second time different than the first time, the first accept request message indicating whether the network coding device accepts the retransmission of the first packet.

Another example provides a network coding device including means for receiving a first sidelink transmission transmitted from a transmitting wireless communication device to a receiving wireless communication device. The first sidelink transmission includes a first packet and a first network coding request flag requesting retransmission of the first packet by the network coding device. The network coding device further includes means for receiving feedback information for the first packet from the receiving wireless communication device at a first time, and means for transmitting a first accept request message to the transmitting wireless communication device at a second time different than the first time, the first accept request message indicating whether the network coding device accepts the retransmission of the first packet.

Another example provides a non-transitory computer-readable medium having stored therein instructions executable by one or more processors of a network coding device to receive a first sidelink transmission transmitted from a transmitting wireless communication device to a receiving wireless communication device. The first sidelink transmission includes a first packet and a first network coding request flag requesting retransmission of the first packet by the network coding device. The non-transitory computer-readable medium further includes instructions executable by the one or more processors of the network coding device to receive feedback information for the first packet from the receiving wireless communication device at a first time, and transmit a first accept request message to the transmitting wireless communication device at a second time different than the first time, the first accept request message indicating whether the network coding device accepts the retransmission of the first packet.

Another example provides a transmitting wireless communication device including a transceiver, a memory, and a processor coupled to the transceiver and the memory. The processor and the memory are configured to transmit a sidelink transmission to a receiving wireless communication device and a network coding device via the transceiver. The sidelink transmission including a first packet and a network coding request flag requesting the network coding device perform one or more retransmissions of the first packet. The processor and the memory are further configured to receive feedback information for the first packet from the receiving wireless communication device at a first time via the transceiver, and receive an accept request message from the network coding device at a second time different than the first time via the transceiver. The accept request message indicates whether the network coding device accepts performing the one or more retransmissions of the first packet.

Another example provides a method for wireless communication at a transmitting wireless communication device. The method includes transmitting a sidelink transmission to a receiving wireless communication device and a network coding device. The sidelink transmission includes a first packet and a network coding request flag requesting retransmission of the first packet by the network coding device. The method further includes receiving feedback information for the first packet from the receiving wireless communication device at a first time, and receiving an accept request message from the network coding device at a second time different than the first time. The accept request message indicates whether the network coding device accepts the retransmission of the first packet.

Another example provides a transmitting wireless communication device including means for transmitting a sidelink transmission to a receiving wireless communication device and a network coding device. The sidelink transmission includes a first packet and a network coding request flag requesting retransmission of the first packet by the network coding device. The transmitting wireless communication device further includes means for receiving feedback information for the first packet from the receiving wireless communication device at a first time, and means for receiving an accept request message from the network coding device at a second time different than the first time. The accept request message indicates whether the network coding device accepts the retransmission of the first packet.

Another example provides a non-transitory computer-readable medium having stored therein instructions executable by one or more processors of a transmitting wireless communication device to transmit a sidelink transmission to a receiving wireless communication device and a network coding device. The sidelink transmission includes a first packet and a network coding request flag requesting retransmission of the first packet by the network coding device. The non-transitory computer-readable medium further includes instructions executable by the one or more processors of the transmitting wireless communication device to receive feedback information for the first packet from the receiving wireless communication device at a first time, and receive an accept request message from the network coding device at a second time different than the first time. The accept request message indicates whether the network coding device accepts the retransmission of the first packet.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
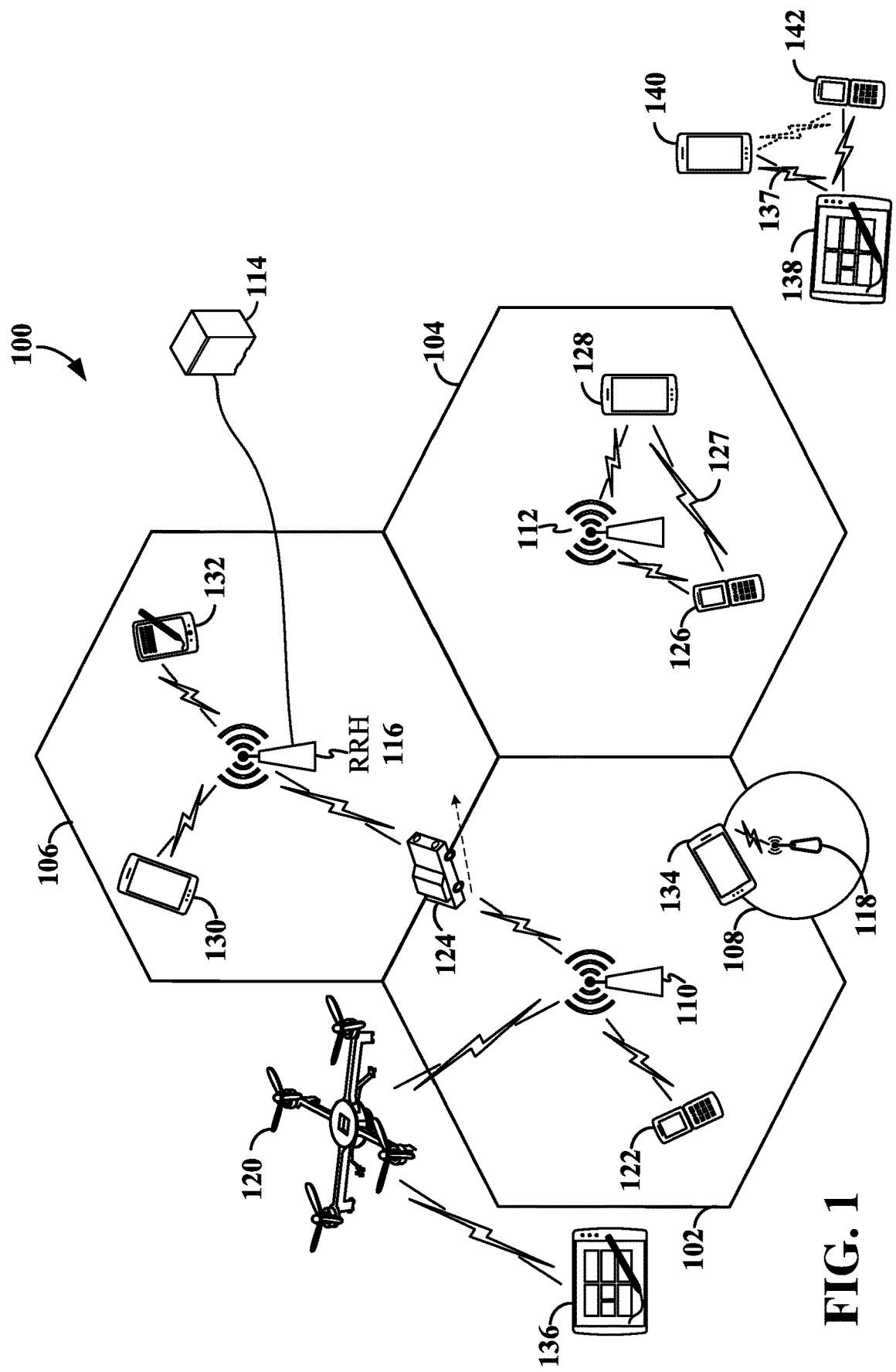
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network coding may be utilized, for example, for sidelink retransmission of one or more packets by a network coding device. For example, a transmitting wireless communication device (e.g., a UE) may transmit an initial sidelink transmission of a packet to one or more receiving wireless communication devices (e.g., UEs) and a network coding device over a sidelink data channel (e.g., a PSSCH). The initial sidelink transmission may include a network coding request flag that requests the network coding device to perform one or more sidelink retransmissions of the packet. The network coding device may then transmit an accept request message to the transmitting UE indicating whether the network coding device accepts the retransmission(s) of the packet. Upon acceptance of the retransmission(s), the network coding device may then retransmit the packet to the one or more receiving UEs as a network coded sidelink transmission. The network coded sidelink transmission may include, for example, a function of the packet and one or more other packets, to be retransmitted to the receiving UEs. The network coding device may be, for example, a roadside unit (RSU), another UE (including one of the receiving UEs), or a base station.

In some examples, turning over retransmissions of the packet to the network coding device may increase the reliability of the packet. For example, the network coding device may be configured to perform more retransmissions than the original transmitting UE. In some examples, the network coding device may select packets for inclusion in a network coded sidelink transmission based on feedback information (e.g., HARQ ACK/NACK) from each of the receiving UEs based on the initial sidelink transmission of the packet from the transmitting UE. In examples in which the network coding device transmits the accept request message at the same time (e.g., within the same slot) as the feedback information, the network coding device may not receive the feedback information due to a half-duplex constraint.

Various aspects of the disclosure relate to techniques for delaying accept request messages for sidelink network coded communication. By delaying the accept request message, the network coding device may receive the feedback information and use the feedback information for selection of packets to include in the network coded transmission.

In some examples, the network coding device may delay the accept request message by a number of slots from the feedback information. For example, the number of slots may correspond to a difference between a first time at which the feedback information is sent and a second time at which the accept request message is sent. In some examples, the network coding device may delay transmission of the accept request message based on a timer. For example, the network coding device may initialize (set) a timer upon receipt of the initial sidelink transmission including the packet and network coding request flag and transmit the accept request message upon expiration of the timer. In some examples, the network coding device may delay transmission of the accept request message by including the accept request message in the network coded sidelink transmission or another network coded packet.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station or UE) end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
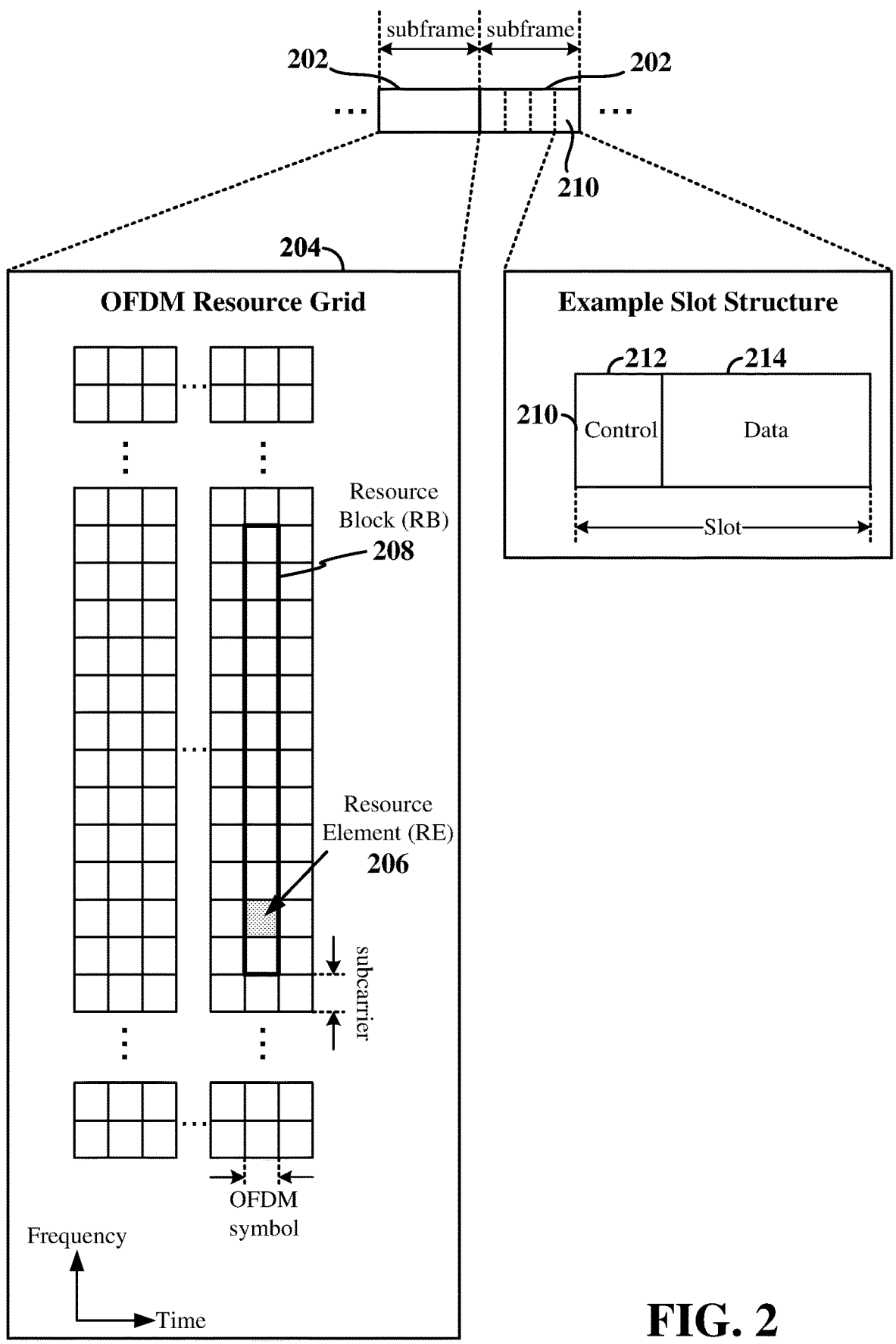
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
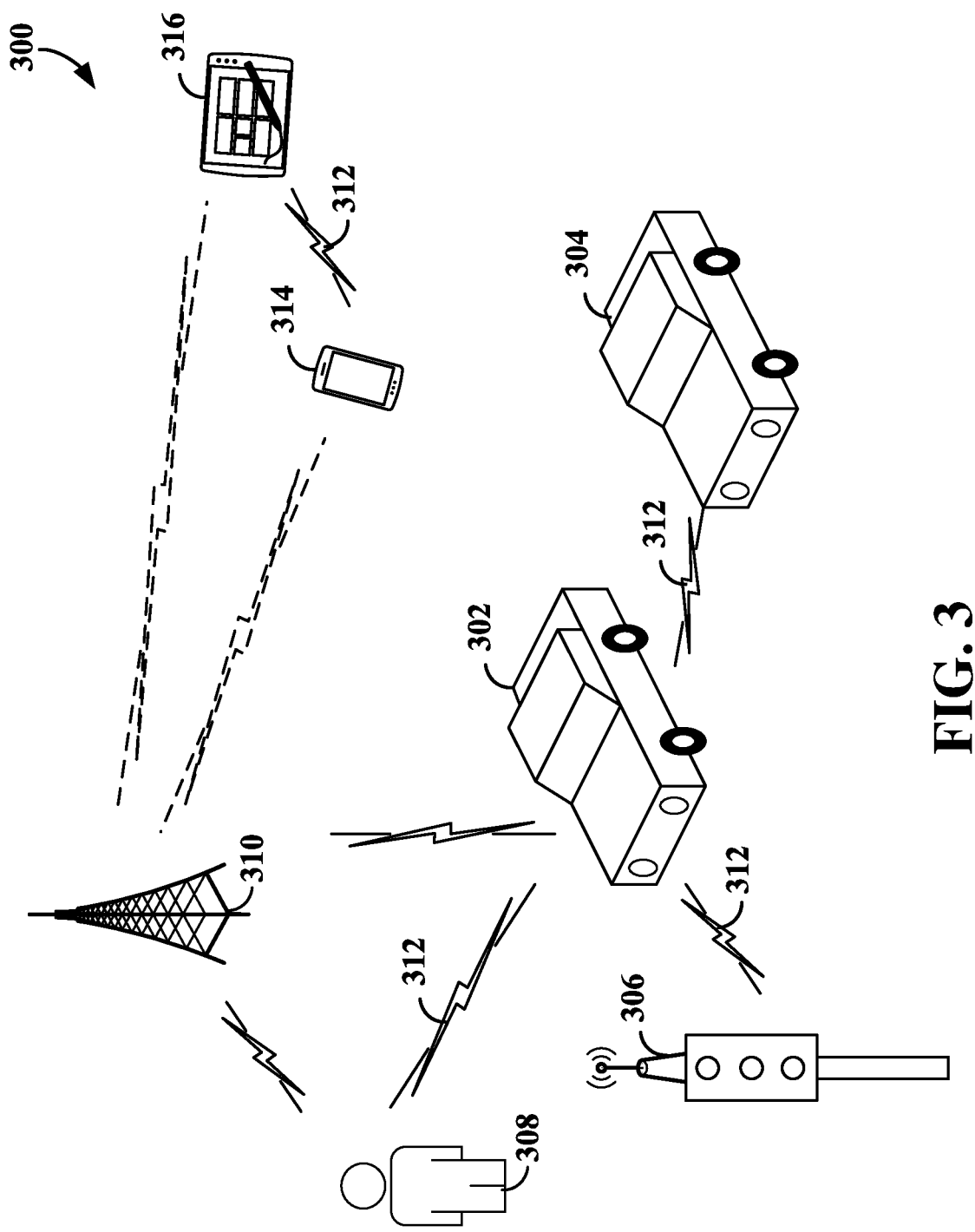
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of retransmission resources reserved for one or more retransmissions of the sidelink transmission (e.g., the sidelink traffic/data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

FIGS. 4A and 4B are diagrams illustrating examples of sidelink slot structures according to some aspects. The sidelink slot structures may be utilized, for example, in a V2X or other D2D network implementing sidelink In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time—frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
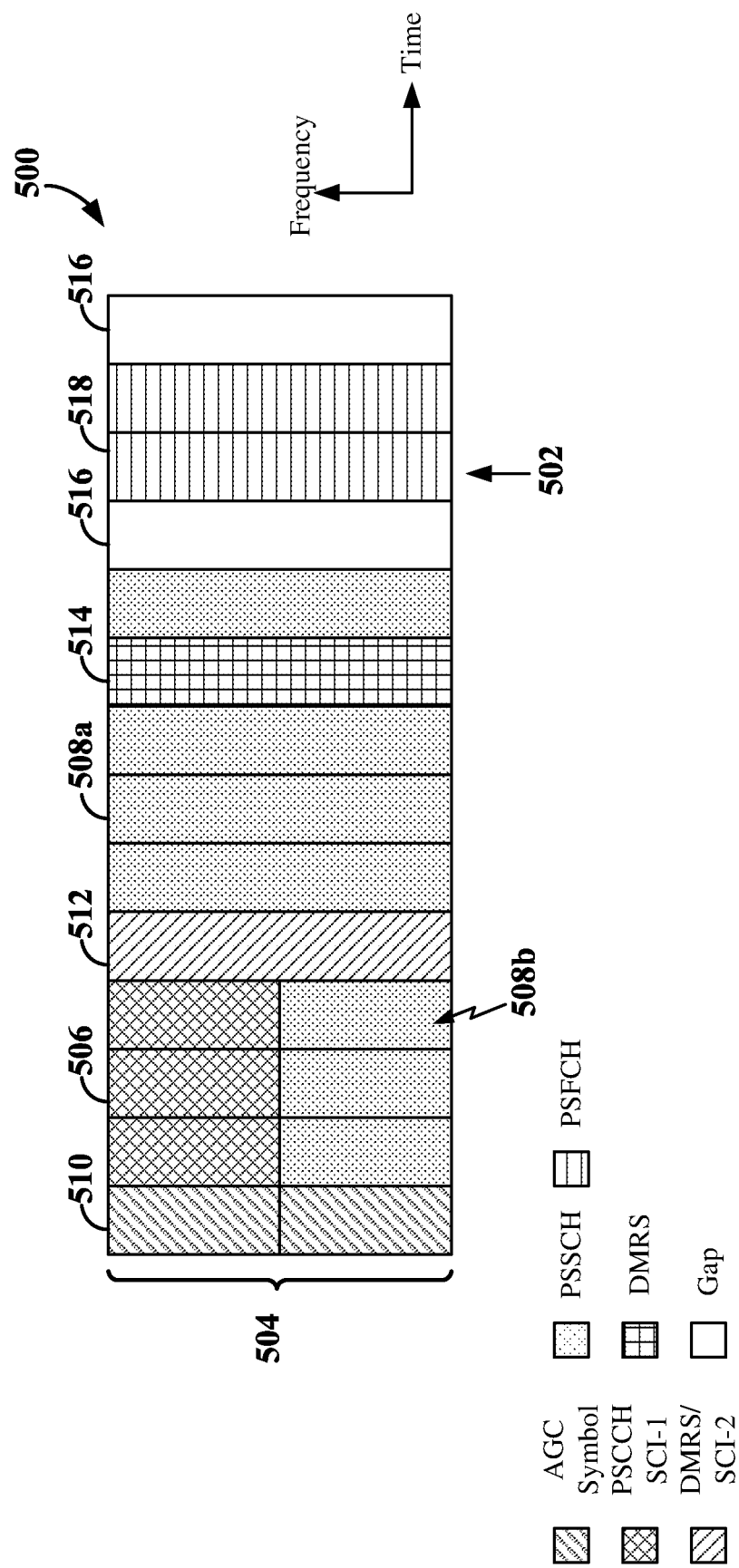
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region of the slot 500. The PSCCH 506 and PSSCH 508 are each transmitted on one or more symbols 502 of the slot 500. The PSCCH 506 includes, for example, SCI-1 that schedules transmission of data traffic on time—frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In some examples, the DMRSs 514 may be based on a Gold sequence and a configuration type 1 may be used for the frequency domain pattern of the PSSCH DMRSs 514. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

In response to receiving a NACK, the transmitting UE may send a HARQ retransmission, which may implement chase combining (HARQ-CC) or incremental redundancy (HARQ-IR). In HARQ-CC, a retransmitted encoded code block (e.g., an encoded packet) is identical to the original transmission. That is, if an encoded code block is not decoded properly at the receiving sidelink device, resulting in a NACK, then the transmitting sidelink device may retransmit the full encoded code block including identical information to the original transmission. The information may then ideally be obtained error-free by virtue of a process called soft combining, where the redundant bits from the retransmission may be combined before decoding to increase the probability of correct reception of each bit. On the other hand, in HARQ-IR, the retransmitted encoded code block may be different from the originally transmitted encoded code block, and further, if multiple retransmissions are made, each retransmission may differ from one another. Here, retransmissions may include different sets of coded bits: for example, corresponding to different code rates or algorithms; corresponding to different portions of the original code block, some of which may not have been transmitted in the original transmission; corresponding to forward error correction (FEC) bits that were not transmitted in the original transmission; or other suitable schemes. As with HARQ-CC, here, the information may be obtained error-free by utilizing soft combining to combine the retransmitted bits with the original transmitted bits.

In various aspects of the disclosure, instead of the transmitting UE initiating one or more retransmissions of the packet based on receiving a NACK, the retransmissions may be turned over to a network coding device in the sidelink network. For example, the transmitting UE may transmit an initial sidelink transmission of a packet over a PSSCH to one or more receiving UEs and a network coding device. The network coding device may then retransmit the packet to the one or more receiving UEs as a network coded sidelink transmission. In some examples, the network coded sidelink transmission may include the packet and one or more additional packets initially transmitted by other UEs.

Figure 6:
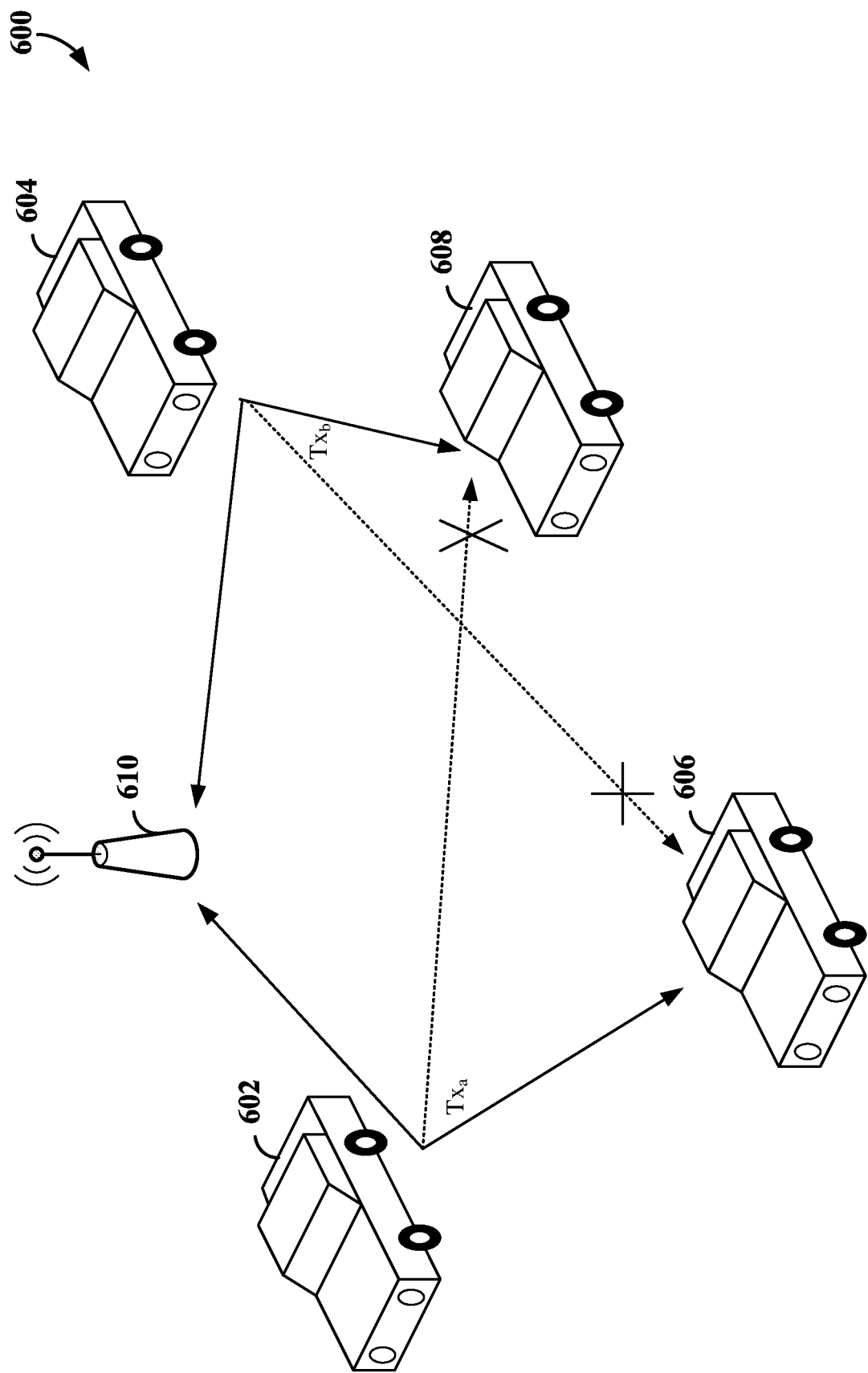
FIG. 6 is a diagram illustrating an example of initial sidelink tranmissions for network coding according to some aspects.

FIG. 6 is a diagram illustrating an example of initial sidelink tranmissions by transmitting UEs (e.g., V-UEs) 602 and 604 to receiving UEs (e.g., V-UEs) 606 and 608 for network coding in a sidelink network 600 according to some aspects. Although UEs 602-608 are illustrated as V-UEs, each of the UEs 602-608 may correspond to any of the UEs, sidelink devices, D2D devices, or other scheduled entities illustrated in FIGS. 1 and/or 3.

In the example shown in FIG. 6, the transmitting UE 602 transmits an initial sidelink transmission $Tx_a$ to the receiving UEs 606 and 608. In addition, the transmitting UE 604 transmits an initial sidelink transmission $Tx_b$ to the receiving UEs 606 and 608. In some examples, each of the initial sidelink transmissions $Tx_a$ and $Tx_b$ may be groupcast or broadcast transmissions.

The initial sidelink transmission $Tx_a$ is successfully received and decoded by the receiving UE 606. Thus, the receiving UE 606 may transmit an ACK (or not transmit a NACK) to the transmitting UE 602 However, the initial sidelink transmission $Tx_a$ is not successfully received and decoded by the receiving UE 608, resulting in the receiving UE 608 transmitting a NACK to the transmitting UE 602. In addition, the initial sidelink transmission $Tx_b$ is successfully received and decoded by the receiving UE 608. As such, the receiving UE 608 may transmit an ACK (or not transmit a NACK) to the transmitting UE 604. However, the initial sidelink transmission $Tx_b$ is not successfully received and decoded by the receiving UE 606, resulting in the receiving UE 606 transmitting a NACK to the transmitting UE 604.

Each of the initial sidelink transmissions $Tx_a$ and $Tx_b$ may further be transmitted to a network coding device 610. The network coding device 610 may be, for example, an RSU, another UE, or a base station (e.g., gNB). For example, each of the initial sidelink transmissions $Tx_a$ and $Tx_b$ may include a network coding request flag requesting network coding of the respective sidelink transmissions $Tx_a$ and $Tx_b$ by the network coding device 610. Upon successfully receiving and decoding the initial sidelink transmissions $Tx_a$ and $Tx_b$, the network coding device 610 may transmit a respective network coding accept request message to each of the transmitting UEs 602 and 604. The network coding accept request messages may correspond, for example, to an ACK of the sidelink transmissions $Tx_a$ and $Tx_b$.

The network coding device 610 may then initiate one or more retransmissions of the sidelink transmissions $Tx_a$ and $Tx_b$. In some examples, the network coding device 610 may initiate sidelink retransmissions regardless of whether one or more of the receiving UEs 606 and 608 NACKed either or both of the initial sidelink transmissions $Tx_a$ and $Tx_b$. In other examples, the network coding device 610 may initiate sidelink retransmissions upon receiving at least one NACK of one or both of the initial sidelink transmissions $Tx_a$ and $Tx_b$.

Figure 7:
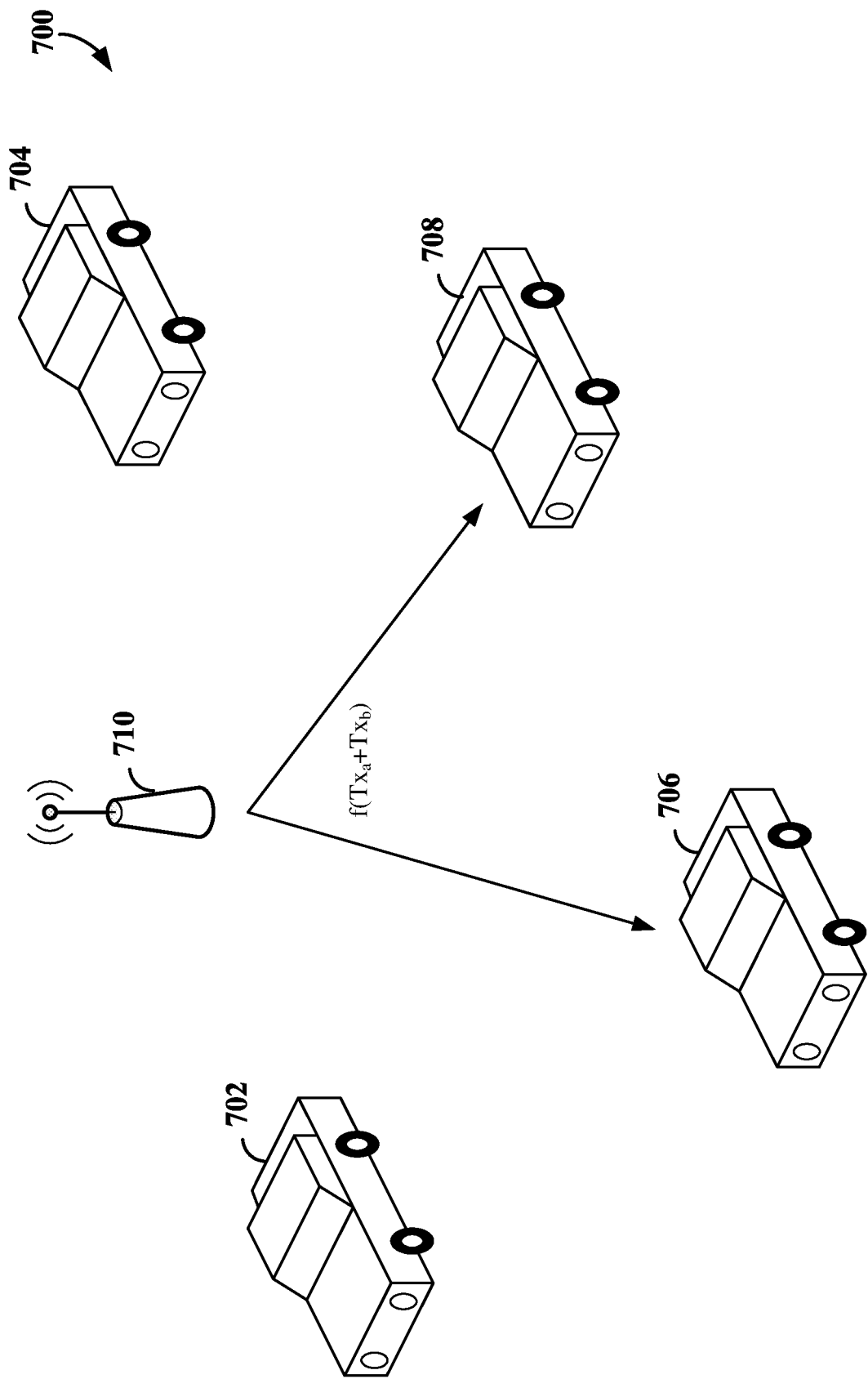
FIG. 7 is a diagram illustrating an example of a network coded retransmission according to some aspects.

FIG. 7 is a diagram illustrating an example of a network coded sidelink transmission in a sidelink network 700 according to some aspects. In the example shown in FIG. 7, the sidelink network 700 includes original transmitting UEs (e.g., V-UEs) 702 and 704, which may correspond, for example, to transmitting UEs 602 and 604 shown in FIG. 6. In addition, the sidelink network 700 includes receiving UEs (e.g., V-UEs) 706 and 708, which may correspond, for example, to receiving UEs 606 and 608 shown in FIG. 6. The sidelink network 700 further includes a network coding device 710, which may correspond, for example, to the network coding device 610 shown in FIG. 6.

The network coding device 710 may be configured to retransmit sidelink transmissions $Tx_a$ and $Tx_b$ received from the transmitting UEs 702 and 704 (e.g., as shown in FIG. 6) as a network coded sidelink transmission. In some examples, the network coded sidelink transmission may be a function (e.g., XOR) of each of the initial sidelink transmissions ($f(Tx_a, Tx_b)$). In some examples, the network coding device 710 may utilize erasure coding as the function to generate the network coded sidelink transmission. With erasure coding, a receiving UE (e.g., UE 706) may recover an erased (incorrectly decoded) transmission by summing the other correctly decoded transmissions. For example, if the network coded sidelink transmission corresponds to $Tx_a \oplus Tx_b$ and the receiving UE 706 previously correctly decoded $Tx_a$, the receiving UE 706 can recover the erased $Tx_b$ by summing $Tx_a$ with the network coded sidelink transmission $Tx_a \oplus Tx_b$ as follows: $Tx_a \oplus (Tx_a \oplus Tx_b)$. The network coding device 710 may further utilize any type of channel coding for subsequently encoding the network coded sidelink transmission. By way of example, but not limitation, the network coding device 710 may utilize turbo coding, low density parity check (LDPC) coding, polar coding, etc. to encode the network coded sidelink transmission.

The receiving UEs 706 and 708 may receive the network coded sidelink transmission and attempt to decode the initial sidelink transmission(s) (e.g., $Tx_a$ and/or $Tx_b$) based on the network coded sidelink transmission. Using the example shown in FIG. 6, the receiving UE 606 may be able to decode $Tx_b$ from the network coded sidelink transmission (f(Tx$_a$, Tx$_b$)) and the originally decoded initial sidelink transmission Tx$_a$. In addition, the receiving UE 608 may be able to decode Tx$_a$ from the network coded sidelink transmission (f(Tx$_a$, Tx$_b$)) and the originally decoded initial sidelink transmission Tx$_b$.

In some examples, utilizing the network coding device 710 to perform the retransmissions of sidelink packets may increase the reliability of the sidelink packets. For example, the network coding device 710 may be configured to perform more retransmissions than the transmitting UEs 702 and 704. In various aspects, the gain in reliability achieved by network coding may be leveraged to increase the spectral efficiency of the initial sidelink transmission by the transmitting UE. For example, the transmitting UEs 702 and 704 may each encode their respective initial sidelink transmissions Tx$_a$ and Tx$_b$ using a higher MCS than a normal MCS that may be used without network coding. By using a higher MCS, the initial sidelink transmission may utilize fewer resources in the frequency domain, thus reducing congestion. As a result, more UEs may be allowed to transmit within the same time resources and/or the probability of colliding transmissions between UEs may be reduced.

Figures 8A, 8B:
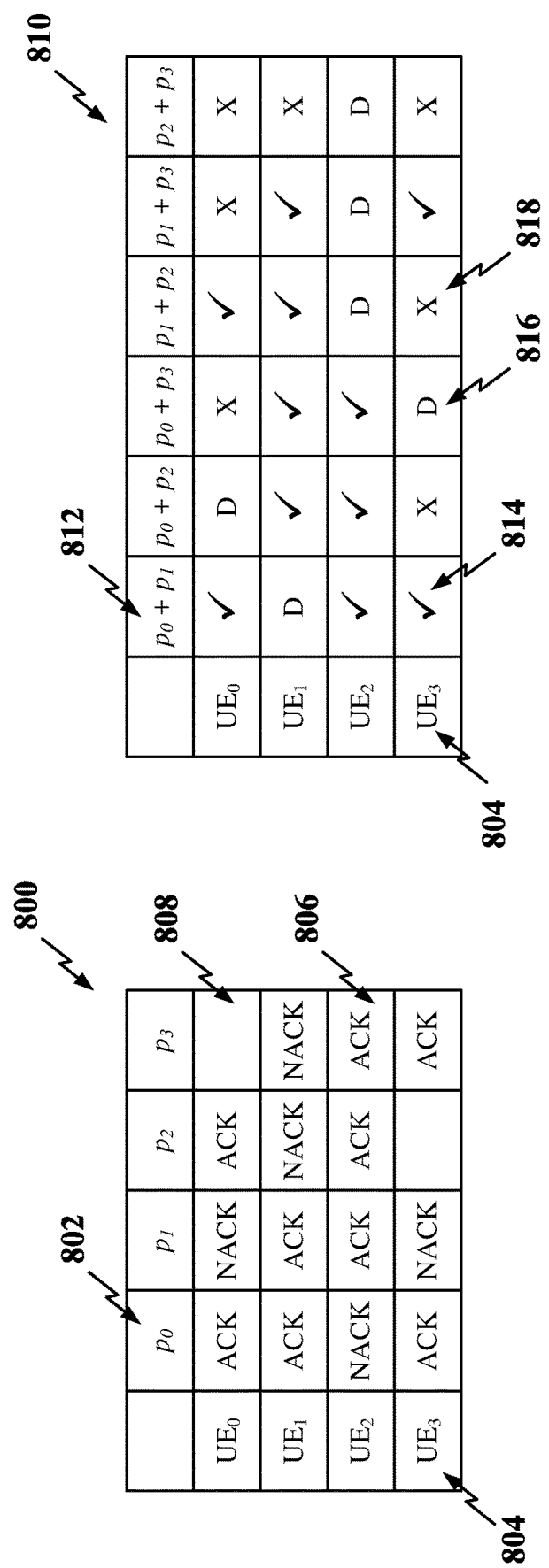
FIGS. 8A and 8B are diagrams illustrating exemplary feedback for initial sidelink transmissions and network coded sidelink transmissions according to some aspects.

FIGS. 8A and 8B are diagrams illustrating exemplary feedback for initial sidelink transmissions and network coded sidelink transmissions according to some aspects. FIG. 8A illustrates a table 800 maintained by a network coding device of a plurality of packets (e.g., transport blocks (TBs)) 802, each intended for receipt by plurality of receiving UEs (Rx UEs) 804. In the example shown in FIG. 8A, there are four packets 802 (e.g., $p_0$, $p_1$, $p_2$, and $p_3$). Each packet 802 is initially transmitted to four Rx UEs (e.g., UE$_0$, UE$_1$, UE$_2$, and UE$_3$). The packets 802 may be transmitted by the same transmitting UE (Tx UE) or by different Tx UEs. The table 800 is populated with feedback information 806 for each of the packets 802 by each of the Rx UEs 804. For example, the table 800 may include feedback information 806 indicating that UE$_0$ transmitted an acknowledgement (ACK) transmitted for packets $p_0$ and $p_2$ and a negative acknowledgement (NACK) for packet $p_1$. An empty cell 808 in the table 800 indicates that no feedback information was received by the network coding device from a particular UE for a particular packet 802.

FIG. 8B illustrates a table 810 maintained by the network coding device of a plurality of network coded packets 812 that may be transmitted to the plurality of Rx UEs 804. In the example shown in FIG. 8B, each network coded packet 812 is a function of two of the initially transmitted packets 802 shown in FIG. 8A (e.g., $p_0+p_1$, $p_0+p_2$, $p_0+p_3$, $p_1+p_2$, $p_1+p_3$, and $p_2+p_3$). A checkmark 814 in a cell of the table 810 indicates that a particular UE may be able to decode a previously undecoded packet from the network coded packet 812, a "D" in a cell indicates that a particular UE previously decoded both of the initially transmitted packets 802 in the network coded packet 812, and an "X" in a cell indicates that a particular UE was unable to decode either of the initially transmitted packets 802 (e.g., based on the network coding device receiving a NACK or no feedback), and therefore, that UE will also be unable to decode the network coded packet 812.

The network coding device may utilize the table 810 to select the network coded packet 812 that maximizes the number of potential NACK to ACK flips. In the example shown in FIG. 8, the first network coded packet 812 (e.g., $p_0+p_1$) in the table 810 may enable three of the UEs 804 to decode a previously undecoded packet. For example, U$_0$ and UE$_3$ may each be able to decode packet $p_1$ from the $p_0+p_1$ network coded packet 812. In addition, UE$_2$ may be able to decode packet $p_0$ from the $p_0+p_1$ network coded packet 812. Therefore, the network coding device may select the $p_0+p_1$ network coded packet 812 as the first network coded packet transmitted to the plurality of UEs 804 since the $p_0+p_1$ network coded packet 812 may result in three NACK to ACK flips (e.g., UE$_0$, UE$_2$, and UE$_3$).

Figure 9:
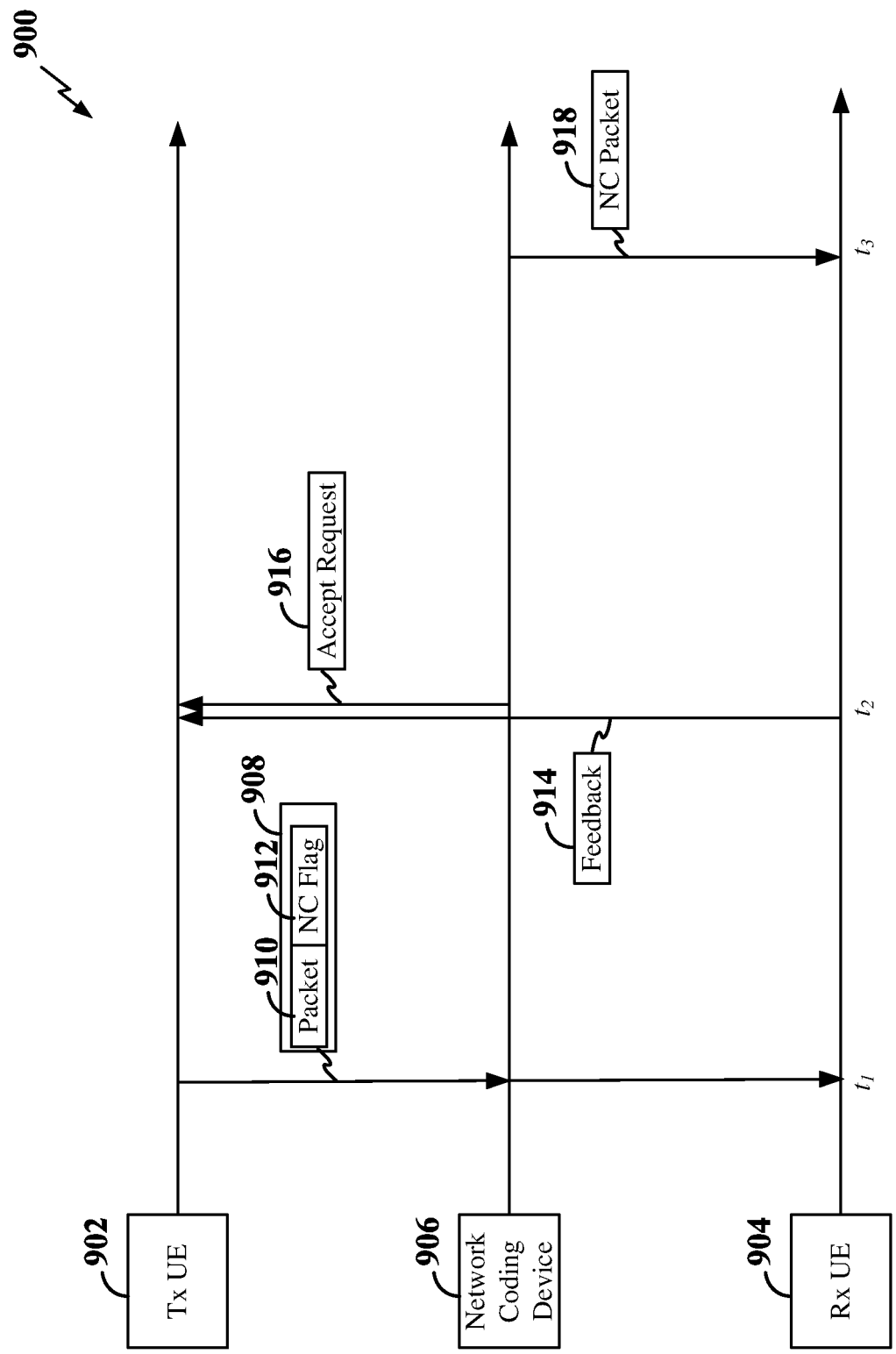
FIG. 9 is a diagram illustrating exemplary signaling for sidelink network coding according to some aspects.

FIG. 9 is a diagram illustrating exemplary signaling 900 for sidelink network coding by a network coding device 906 of a sidelink transmission initially transmitted from a Tx UE 902 to an Rx UE 904 according to some aspects. The Tx UE 902 and Rx UE 904 may correspond to any of the UEs, sidelink devices, V2X devices, D2D devices, or other scheduled entities illustrated in any of FIGS. 1, 3, 6 and/or 7. In some examples, the Rx UE 904 may represent one or more Rx UEs of an initial sidelink transmission by the Tx UE 902. The network coding device 906 may correspond to the network coding devices shown in FIGS. 6 and/or 7 and may include, for example, an RSU, another UE, or a gNB. In some examples, the network coding device 906 may be one of the destination UEs for the initial sidelink transmission.

At a first time ($t_1$), the Tx UE 902 may transmit an initial sidelink transmission 908 including a packet 910 and a network coding request flag 912. In some examples, the initial sidelink transmission 908 may be transmitted over a sidelink data channel (e.g., a PSSCH) and the network coding request flag may be transmitted over a sidelink control channel (e.g., via SCI within a PSCCH). For example, the network coding request flag may include a single bit within SCI-1 carrying the PSSCH resource assignment for the encoded packet or within SCI-2 associated with the PSSCH. The initial sidelink transmission including the encoded packet and network coding request flag may be received by the network coding device 906 and may further be received by one or more Rx UEs 904 (only one of which is shown for convenience) to which the packet is destined. For example, the initial sidelink transmission 908 may be a unicast, groupcast, or broadcast transmission destined for one or more Rx UEs 904.

At a second time ($t_2$), the Rx UE 904 (and each other Rx UE to which the initial sidelink transmission 908 is destined) may transmit feedback information 914 (e.g., HARQ ACK/NACK) to the Tx UE 902 indicating whether the Rx UE 904 was able to successfully decode the packet. In addition, at the second time ($t_2$), the network coding device 906 may transmit a network coding accept request message 916 to the Tx UE 902 to indicate whether the network coding device 906 will perform network coding of the packet. In some examples, the accept request message 916 may correspond to an ACK of the initial sidelink transmission.

At a third time ($t_3$), the network coding device 906 may retransmit the packet as a network coded sidelink transmission to the one or more Rx UEs 904. In some examples, the network coded sidelink transmission may be a function (e.g., XOR) of the packet 910 and one or more other packets transmitted by the same Tx UE 902 or another Tx UE to the one or more Rx UEs 904.

In half-duplex communication, the frequencies utilized for transmission and reception are the same. Therefore, a wireless communication device (e.g., the network coding device 906) may be constrained from transmitting and receiving at the same time. This constraint is referred to herein as a half-duplex (HD) constraint. Because of the HD constraint, the network coding device 906 may not receive the feedback information 914 transmitted from the Rx UE 904 to the Tx UE 902 since the network coding device 906 is transmitting the accept request message 916 at the same time (e.g., time $t_2$, which may correspond, for example, to a slot). As indicated in FIGS. 8A and 8B, receipt of the feedback information 914 may improve network coded sidelink transmissions by enabling the network coding device 906 to select the packets for retransmission that maximize NACK to ACK flips. Therefore, in various aspects of the disclosure, the network coding device 906 may stagger transmission of the accept request message 916 relative to the feedback information 914 to enable receipt of the feedback information 914 by the network coding device 906.

In some examples, the accept request message 916 may be delayed with respect to the feedback information 914. In this example, the accept request message 916 may be transmitted at a time that is subsequent to (e.g., later than) than the time at which the feedback information 914 is transmitted. In other examples, the accept request message 916 may be sent in advance of (e.g., prior to) the feedback information 914. In this example, the accept request message 915 may be transmitted at a time that is earlier than (e.g., prior to) the time at which the feedback information 914 is transmitted.

Figure 10:
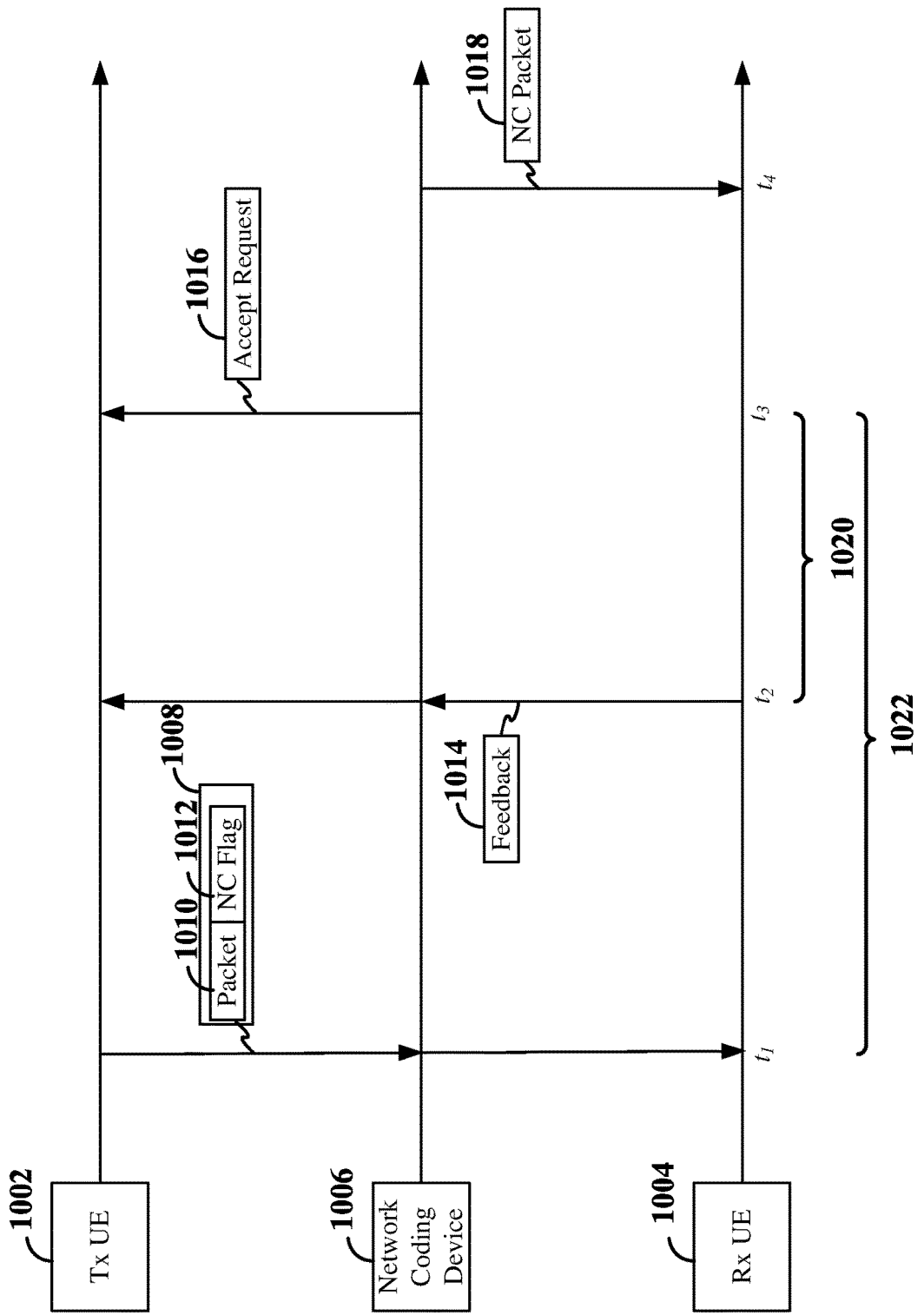
FIG. 10 is a diagram illustrating exemplary signaling for delaying accept request messages in sidelink network coding according to some aspects.

FIG. 10 is a diagram illustrating exemplary signaling 1000 for delaying accept request messages in sidelink network coding according to some aspects. FIG. 10 illustrates signaling 1000 between a Tx UE 1002, an Rx UE 1004 and a network coding device 1006. The Tx UE 1002 and Rx UE 1004 may correspond to any of the UEs, sidelink devices, V2X devices, D2D devices, or other scheduled entities illustrated in any of FIGS. 1, 3, 6, 7, and/or 9. In some examples, the Rx UE 1004 may represent one or more Rx UEs of an initial sidelink transmission by the Tx UE 1002. The network coding device 1006 may correspond to the network coding devices shown in FIGS. 6, 7 and/or 9 and may include, for example, an RSU, another UE, or a gNB. In some examples, the network coding device 1006 may be one of the Rx UEs.

At a first time ($t_1$), the Tx UE 1002 may transmit an initial sidelink transmission 1008 including a packet 1010 and a network coding request flag 1012. In some examples, the initial sidelink transmission 1008 may be transmitted over a sidelink data channel (e.g., a PSSCH) and the network coding request flag may be transmitted over a sidelink control channel (e.g., via SCI within a PSCCH). For example, the network coding request flag may include a single bit within SCI-1 carrying the PSSCH resource assignment for the encoded packet or within SCI-2 associated with the PSSCH. The initial sidelink transmission including the encoded packet and network coding request flag may be received by the network coding device 1006 and may further be received by one or more Rx UEs 1004 (only one of which is shown for convenience) to which the packet is destined. For example, the initial sidelink transmission 1008 may be a unicast, groupcast, or broadcast transmission destined for one or more Rx UEs 1004.

At a second time ($t_2$), the Rx UE 1004 (and each other Rx UE to which the initial sidelink transmission 1008 is destined) may transmit feedback information 1014 (e.g., HARQ ACK/NACK) to the Tx UE 1002 indicating whether the Rx UE 1004 was able to successfully decode the packet. The feedback information 1014 may further be received by the network coding device 1006.

At a third time ($t_3$), the network coding device 1006 may transmit a network coding accept request message 1016 to the Tx UE 1002 to indicate whether the network coding device 1006 will perform network coding of the packet. In an aspect, the network coding device 1006 may delay transmission of the accept request message 1016 by a duration of time 1020 between the receipt of the feedback information 1014 at time $t_2$ and transmission of the accept request message 1016 at time $t_3$ to enable receipt of the feedback information 1014 at time $t_2$ by the network coding device 1006. In some examples, the duration of time 1020 may correspond to a number of slots, which may be fixed or variable. For example, the number of slots between receipt of the feedback information 1014 and transmission of the accept request message 1016 may be pre-configured (e.g., via the original equipment manufacturer (OEM) based on, for example, one or more sidelink standards or specifications or via radio resource control (RRC) signaling by a base station) or configured by the network coding device 1006 and sent to the Tx UE 1002. In some examples, the maximum number of slots that may be configured may be dependent upon one or more parameters. Examples of parameters include, but are not limited to, a priority of the packet 1010 or a packet delay budget (PDB) associated with the packet 1010.

In some examples, the duration of time 1020 may be based on a timer. For example, the network coding device 1006 may initiate (set) a timer upon receipt of the sidelink transmission 1008 from the Tx UE 1002. The timer may have a timer duration 1022 configured to produce a delay between receipt of the feedback information 1014 and transmission of the accept request message 1016 corresponding to the duration of time 1020. In this example, the network coding device 1006 may transmit the accept request message 1016 upon expiration of the timer. In some examples, the timer duration 1022 may be pre-configured (e.g., via the original equipment manufacturer (OEM) based on, for example, one or more sidelink standards or specifications or via radio resource control (RRC) signaling by a base station) or configured by the network coding device 1006 and sent to the Tx UE 1002. In some examples, the timer duration may be dependent upon one or more parameters. Examples of parameters include, but are not limited to, a priority of the packet 1010 or a packet delay budget (PDB) associated with the packet 1010.

In some examples, the network coding device 1006 may lock the timer upon receipt of the first sidelink transmission 1008 that includes a network coding request flag 1012. As a result, the network coding device 1006 may use a single timer for the first sidelink transmission 1008 and all subsequent sidelink transmissions that include network coding request flags 1012 received prior to expiration of the timer. In this example, the network coding device may combine the accept request messages for each of the sidelink transmissions received during the timer duration 1022 and transmit a combined accept request message including the accept request message 1016 for the Tx UE 1002 upon expiration of the timer.

At a fourth time ($t_4$), the network coding device 1006 may retransmit the packet as a network coded sidelink transmission to the one or more Rx UEs 1004. In some examples, the network coded sidelink transmission may be a function (e.g., XOR) of the packet 1010 and one or more other packets transmitted by the same Tx UE 1002 or another Tx UE to the one or more Rx UEs 1004.

Figure 11:
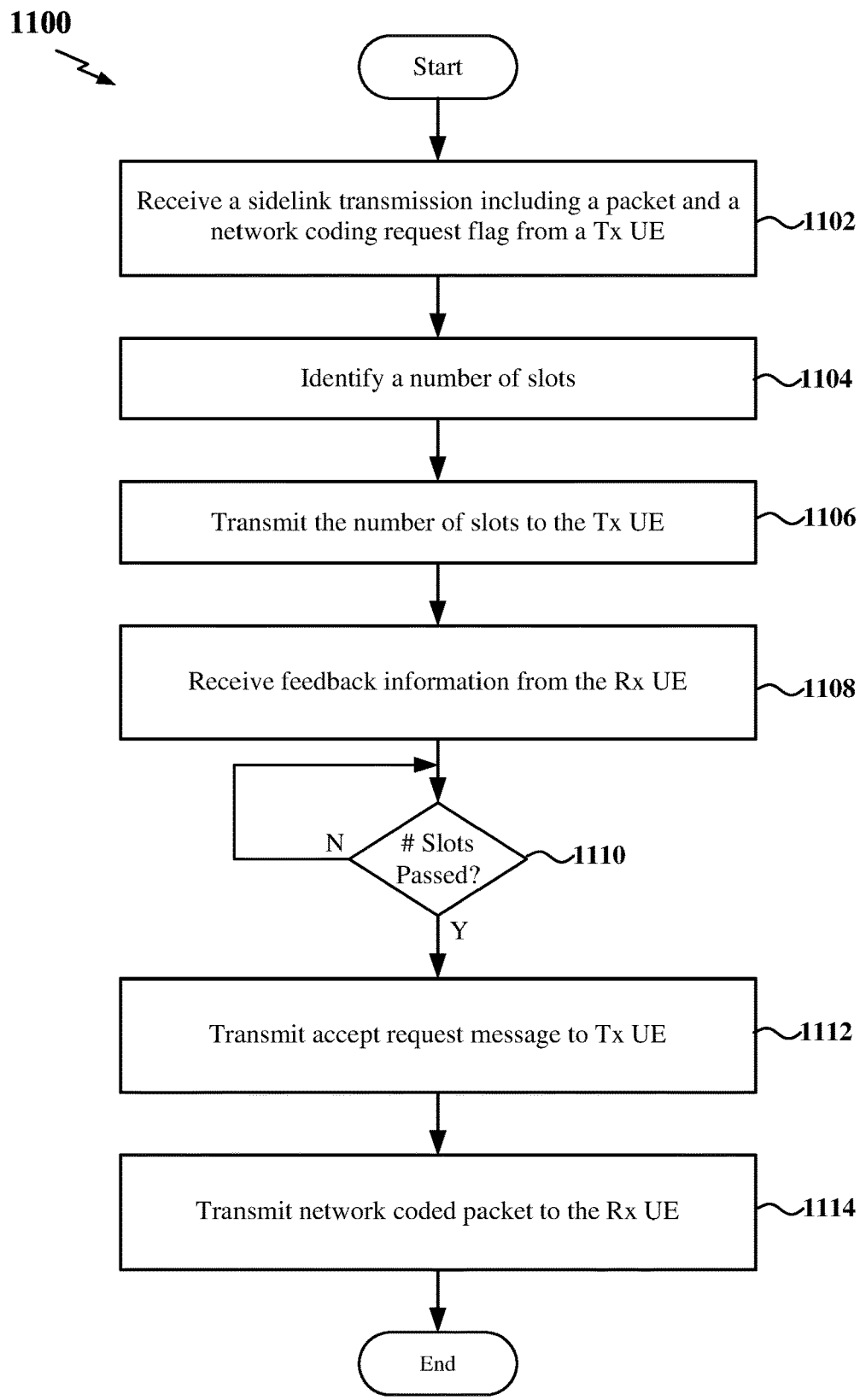
FIG. 11 is a flow chart illustrating an exemplary process for slot-based delay of accept request messages in sidelink network coding according to some aspects.

FIG. 11 is a flow chart illustrating an exemplary process 1100 for slot-based delay of accept request messages in sidelink network coding according to some aspects. As described below, some or all illustrated features may be omitted in a particular implementation within the scope of the present disclosure, and some illustrated features may not be required for implementation of all examples. In some examples, the method may be performed by the network coding device 1800, as described below and illustrated in FIG. 18, by a processor or processing system, or by any suitable means for carrying out the described functions.

At block 1102, the network coding device may receive an initial sidelink transmission from a Tx UE including a packet and a network coding request flag. In some examples, the initial sidelink transmission may be transmitted over a sidelink data channel (e.g., a PSSCH) and the network coding request flag may be transmitted over a sidelink control channel (e.g., via SCI within a PSCCH). For example, the network coding request flag may include a single bit within SCI-1 carrying the PSSCH resource assignment for the encoded packet or within SCI-2 associated with the PSSCH. The initial sidelink transmission including the encoded packet and network coding request flag may be received by the network coding device and may further be received by one or more Rx UEs to which the packet is destined. For example, the initial sidelink transmission may be a unicast, groupcast, or broadcast transmission destined for one or more Rx UEs.

At block 1104, the network coding device may identify a number of slots between receipt of the initial sidelink transmission that includes the network coding request flag and transmission of an accept request message. In some examples, the number of slots may be pre-configured on at least the network coding device (e.g., via the OEM based on, for example, one or more sidelink standards or specifications or via radio resource control (RRC) signaling by a base station). In other examples, the network coding device may select the number of slots. For example, the network coding device may configure the number of slots based on one or more parameters. Examples of parameters include, but are not limited to, a priority of the packet or a packet delay budget (PDB) associated with the packet.

At block 1106, the network coding device may optionally transmit the number of slots to the Tx UE. For example, the network coding device may transmit the number of slots to the Tx UE when the network coding device configures the number of slots based on one or more parameters. In examples in which the number of slots is pre-configured on the network coding device, the network coding device may not transmit the number of slots to the Tx UE. For example, if the number of slots is also pre-configured on the Tx UE (e.g., via the OEM or RRC signaling), the network coding device may not transmit the number of slots to the Tx UE.

At block 1108, the network coding device may receive feedback information (e.g., HARQ ACK/NACK) for the packet from the Rx UE. For example, the feedback information may be transmitted from the Rx UE to the Tx UE and further be received by the network coding device.

At block 1110, the network coding device may determine whether the number of slots has passed since receipt of the feedback information. If the number of slots has passed (Y branch of block 1110), at block 1112, the network coding device may transmit an accept request message to the Tx UE that indicates whether the network coding device accepts performing retransmission(s) of the packet. Thus, the network coding device may delay transmission of the accept request message by the number of slots identified by the network coding device at block 1104. As such, at block 1112, the network coding device transmits the accept request message after the number of slots from receipt of the feedback information.

At block 1114, the network coding device may transmit a network coded packet including a retransmission of the packet received at block 1102. In some examples, the network coded packet may be a function (e.g., XOR) of the packet received at block 1102 and one or more other packets transmitted by the same Tx UE or another Tx UE to the one or more Rx UEs.

Figure 12:
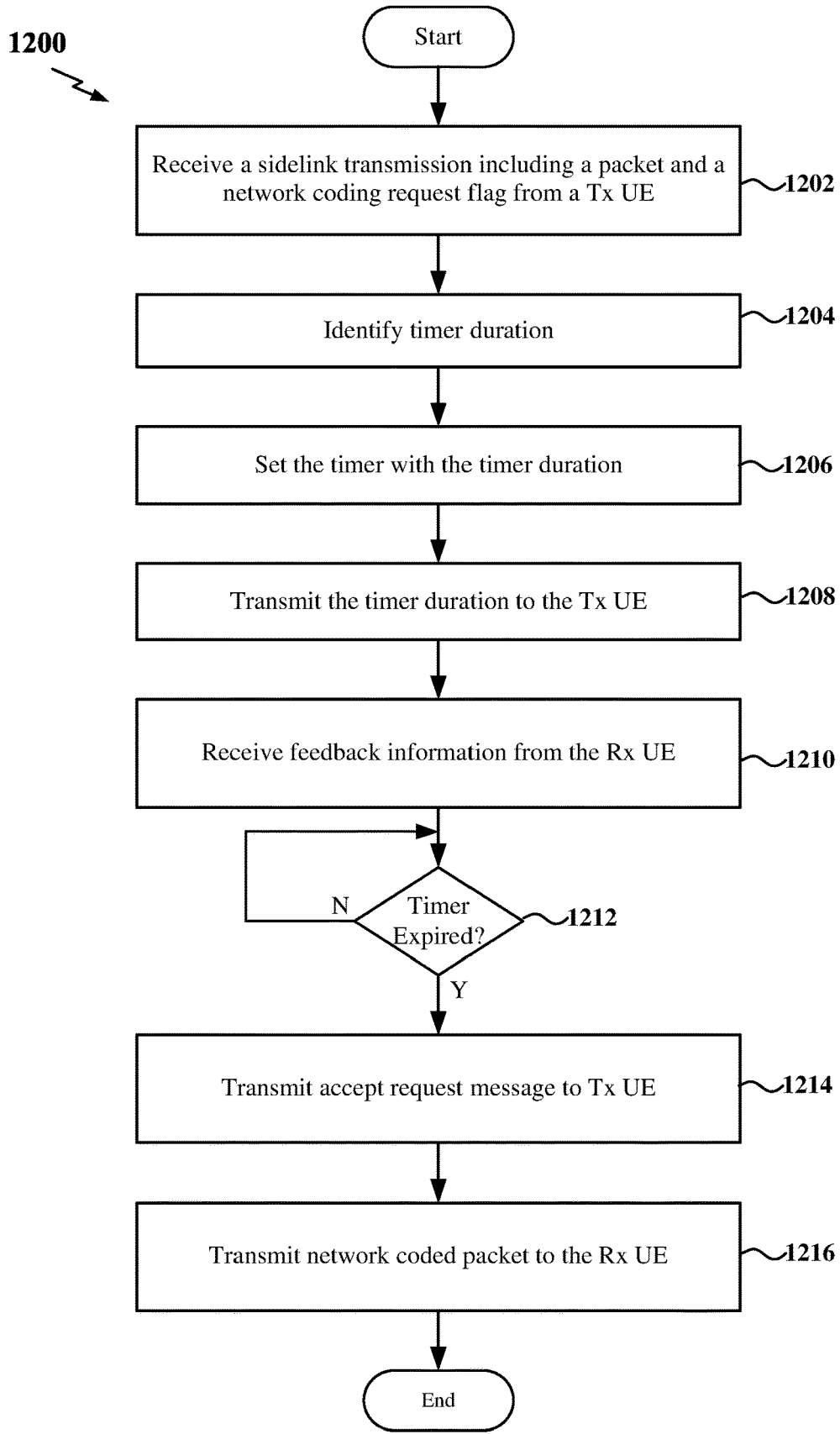
FIG. 12 is a flow chart illustrating an exemplary process for timer-based staggering of accept request messages and feedback information in sidelink network coding according to some aspects.

FIG. 12 is a flow chart illustrating an exemplary process 1200 for timer-based staggering of accept request messages and feedback information in sidelink network coding according to some aspects. As described below, some or all illustrated features may be omitted in a particular implementation within the scope of the present disclosure, and some illustrated features may not be required for implementation of all examples. In some examples, the method may be performed by the network coding device 1800, as described below and illustrated in FIG. 18, by a processor or processing system, or by any suitable means for carrying out the described functions.

At block 1202, the network coding device may receive an initial sidelink transmission from a Tx UE including a packet and a network coding request flag. In some examples, the initial sidelink transmission may be transmitted over a sidelink data channel (e.g., a PSSCH) and the network coding request flag may be transmitted over a sidelink control channel (e.g., via SCI within a PSCCH). For example, the network coding request flag may include a single bit within SCI-1 carrying the PSSCH resource assignment for the encoded packet or within SCI-2 associated with the PSSCH. The initial sidelink transmission including the encoded packet and network coding request flag may be received by the network coding device and may further be received by one or more Rx UEs to which the packet is destined. For example, the initial sidelink transmission may be a unicast, groupcast, or broadcast transmission destined for one or more Rx UEs.

At block 1204, the network coding device may identify a timer duration configured to stagger transmission of an accept request message with respect to feedback information received from an Rx UE. In some examples, the timer duration may be pre-configured on at least the network coding device (e.g., via the OEM based on, for example, one or more sidelink standards or specifications or via radio resource control (RRC) signaling by a base station). In other examples, the network coding device may select the timer duration. For example, the network coding device may configure the timer duration based on one or more parameters. Examples of parameters include, but are not limited to, a priority of the packet or a packet delay budget (PDB) associated with the packet.

At block 1206, the network coding device may set (initialize) the timer with the timer duration. At block 1208, the network coding device may optionally transmit the timer duration to the Tx UE. For example, the network coding device may transmit the timer duration to the Tx UE when the network coding device configures the timer duration based on one or more parameters. In examples in which the timer duration is pre-configured on the network coding device, the network coding device may not transmit the timer duration to the Tx UE. For example, if the timer duration is also pre-configured on the Tx UE (e.g., via the OEM or RRC signaling), the network coding device may not transmit the timer duration to the Tx UE.

At block 1210, the network coding device may receive feedback information (e.g., HARQ ACK/NACK) for the packet from the Rx UE. For example, the feedback information may be transmitted from the Rx UE to the Tx UE and further be received by the network coding device. In some examples, the feedback information may be received prior to expiration of the timer (as shown in FIG. 12). In other examples, the feedback information may be received after expiration of the timer. In this example, the feedback information may be received at a time that is later than the time of transmission of the accept request message.

At block 1212, the network coding device may determine whether the timer has expired. If the timer has expired (Y branch of block 1212), at block 1214, the network coding device may transmit an accept request message to the Tx UE that indicates whether the network coding device accepts performing retransmission(s) of the packet. Thus, the timer duration may be configured to produce a delay between receipt of the feedback information at block 1210 and transmission of the accept request message at block 1214.

At block 1216, the network coding device may transmit a network coded packet including a retransmission of the packet received at block 1202. In some examples, the network coded packet may be a function (e.g., XOR) of the packet received at block 1202 and one or more other packets transmitted by the same Tx UE or another Tx UE to the one or more Rx UEs.

Figure 13:
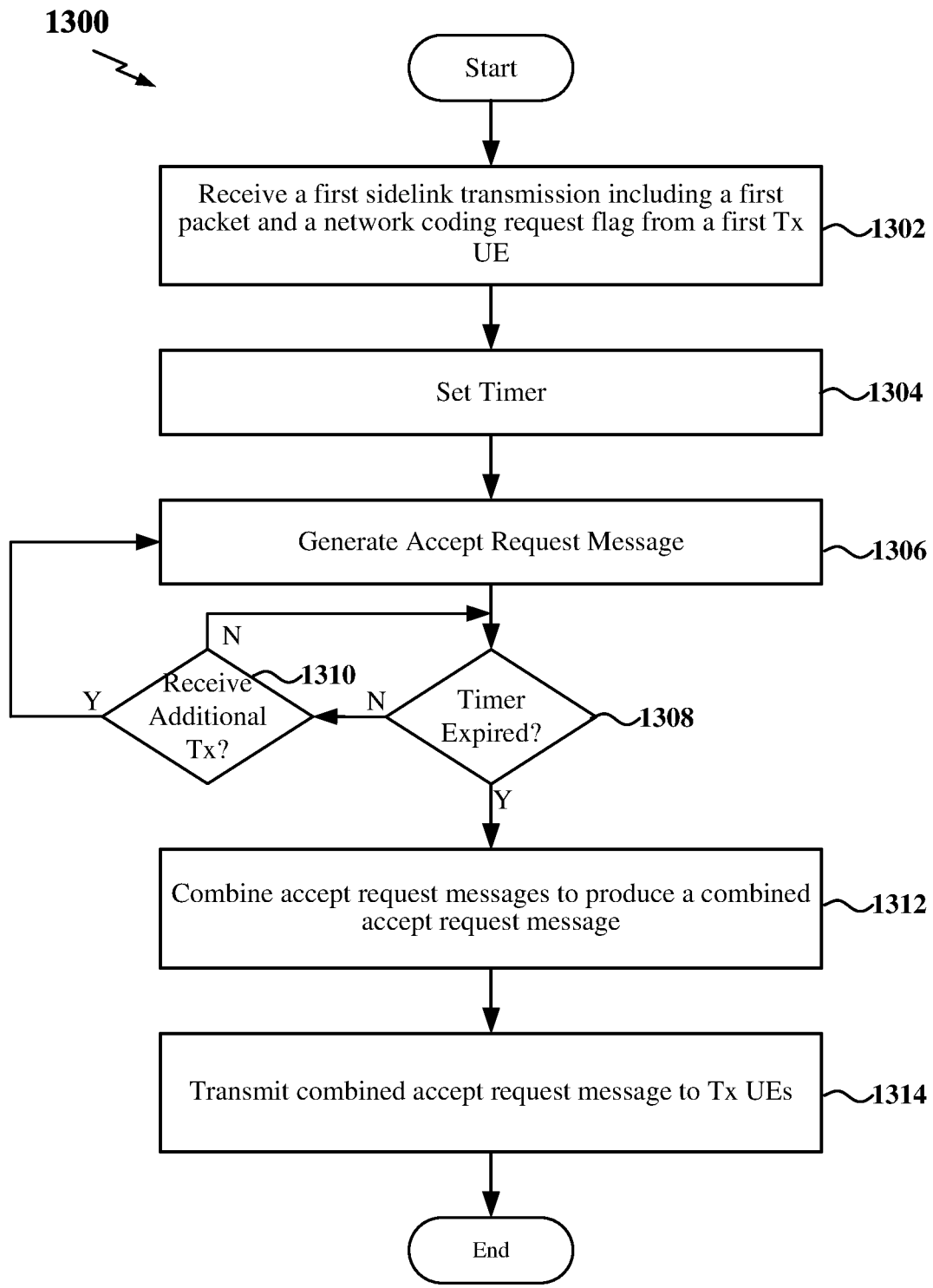
FIG. 13 is a flow chart illustrating an exemplary process for timer-based staggering of accept request messages and feedback information according to some aspects.

FIG. 13 is a flow chart illustrating an exemplary process 1300 for timer-based delay of multiple accept request messages in sidelink network coding according to some aspects. As described below, some or all illustrated features may be omitted in a particular implementation within the scope of the present disclosure, and some illustrated features may not be required for implementation of all examples. In some examples, the method may be performed by the network coding device 1800, as described below and illustrated in FIG. 18, by a processor or processing system, or by any suitable means for carrying out the described functions.

At block 1302, the network coding device may receive a first sidelink transmission from a first Tx UE including a first packet and a network coding request flag. In some examples, the first sidelink transmission may be transmitted over a sidelink data channel (e.g., a PSSCH) and the network coding request flag may be transmitted over a sidelink control channel (e.g., via SCI within a PSCCH). For example, the network coding request flag may include a single bit within SCI-1 carrying the PSSCH resource assignment for the encoded packet or within SCI-2 associated with the PSSCH. The first sidelink transmission including the encoded packet and network coding request flag may be received by the network coding device and may further be received by one or more Rx UEs to which the packet is destined. For example, the initial sidelink transmission may be a unicast, groupcast, or broadcast transmission destined for one or more Rx UEs.

At block 1304, the network coding device may set a timer upon receipt of the first sidelink transmission. In some examples, the timer is initialized with a timer duration configured to delay transmission of an accept request message for the first sidelink transmission with respect to feedback information received for the sidelink transmission. The timer duration may be pre-configured (e.g., via the original equipment manufacturer (OEM) based on, for example, one or more sidelink standards or specifications or via radio resource control (RRC) signaling by a base station) or configured by the network coding device.

At block 1306, the network coding device may generate an accept request message for the first packet. In some examples, the accept request message may include a packet identifier identifying the packet, a source identifier (e.g., a UE ID) identifying the first Tx UE, and a network coding indicator (e.g., a single bit) indicating whether the network coding device accepts performing retransmission(s) of the first packet.

At block 1308, the network coding device may determine whether the timer has expired. If the timer has not expired (N branch of block 1308), at block 1310, the network coding device may receive one or more additional sidelink transmissions, each including a respective additional packet and a respective additional network coding request from the same first Tx UE or another Tx UE prior to expiration of the timer. For each additional sidelink transmission received by the network coding device, the network coding device may generate a respective accept request message for the respective packet at block 1306.

Once the timer expires (Y branch of block 1308), at block 1312, the network coding device may combine the accept request messages to produce a combined accept request message. At block 1314, the network coding device may then transmit the combined accept request message to the plurality of Tx UEs (including the first Tx UE) that sent sidelink transmissions including network coding request flags during the timer duration. The combined accept request message may be, for example, groupcasted or multicasted to the plurality of Tx UEs.

Figure 14:
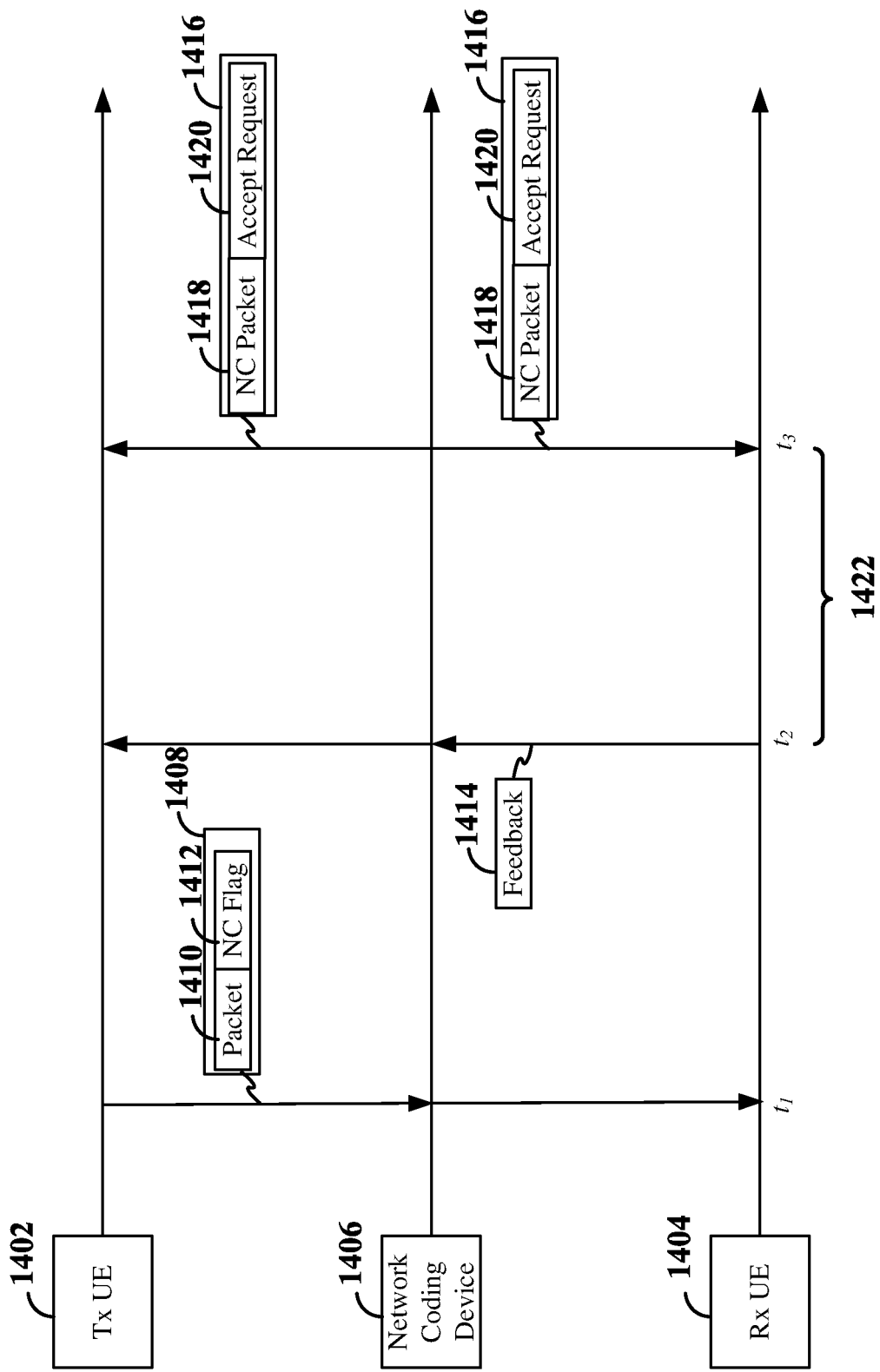
FIG. 14 is a diagram illustrating exemplary signaling for including accept request messages within network coded retransmissions according to some aspects.

FIG. 14 is a diagram illustrating exemplary signaling for including accept request messages within network coded sidelink transmissions according to some aspects. FIG. 14 illustrates signaling between a Tx UE 1402, an Rx UE 1404 and a network coding device 1406. The Tx UE 1402 and Rx UE 1404 may correspond to any of the UEs, sidelink devices, V2X devices, D2D devices, or other scheduled entities illustrated in any of FIGS. 1, 3, 6, 7, 9 and/or 10. In some examples, the Rx UE 1404 may represent one or more Rx UEs of an initial sidelink transmission by the Tx UE 1402. The network coding device 1406 may correspond to the network coding devices shown in FIGS. 6, 7, 9 and/or 10 and may include, for example, an RSU, another UE, or a gNB. In some examples, the network coding device 1406 may be one of the Rx UEs.

At a first time ($t_1$), the Tx UE 1402 may transmit an initial sidelink transmission 1408 including a packet 1410 and a network coding request flag 1412. In some examples, the initial sidelink transmission 1408 may be transmitted over a sidelink data channel (e.g., a PSSCH) and the network coding request flag may be transmitted over a sidelink control channel (e.g., via SCI within a PSCCH). For example, the network coding request flag may include a single bit within SCI-1 carrying the PSSCH resource assignment for the encoded packet or within SCI-2 associated with the PSSCH. The initial sidelink transmission including the encoded packet and network coding request flag may be received by the network coding device 1406 and may further be received by one or more Rx UEs 1404 (only one of which is shown for convenience) to which the packet is destined. For example, the initial sidelink transmission 1408 may be a unicast, groupcast, or broadcast transmission destined for one or more Rx UEs 1404.

At a second time ($t_2$), the Rx UE 1404 (and each other Rx UE to which the initial sidelink transmission 1408 is destined) may transmit feedback information 1414 (e.g., HARQ ACK/NACK) to the Tx UE 1402 indicating whether the Rx UE 1404 was able to successfully decode the packet. The feedback information 1414 may further be received by the network coding device 1406.

At a third time ($t_3$), the network coding device 1406 may transmit a network coded sidelink transmission 1416 including a network coded packet 1418 and an accept request message 1420 that indicates whether the network coding device 1406 will perform network coding of the packet 1410. In an aspect, the network coding device 1406 may delay transmission of the accept request message 1420 by a duration of time 1422 between the receipt of the feedback information 1414 at time $t_2$ and transmission of the accept request message 1420 at time $t_3$ to enable receipt of the feedback information 1414 at time $t_2$ by the network coding device 1406. In some examples, the duration of time 1422 may correspond to the time between receipt of the feedback information 1414 and the next scheduled network coded sidelink transmission 1416.

In some examples, the network coded sidelink transmission may be transmitted to the one or more Rx UEs 1404 and the Tx UE 1402. In some examples, the network coded packet 1418 may be a function (e.g., XOR) of the packet 1410 and one or more other packets transmitted by the same Tx UE 1402 or another Tx UE to the one or more Rx UEs 1404. In other examples, the network coded packet 1418 may be a function (e.g., XOR) of other packets excluding the packet 1410 received from the Tx UE 1402. In this example, the accept request message 1420 may indicate that the network coding device 1406 does not accept retransmission(s) of the packet 1410 (e.g., will not perform network coding of the packet 1410).

Figure 15:
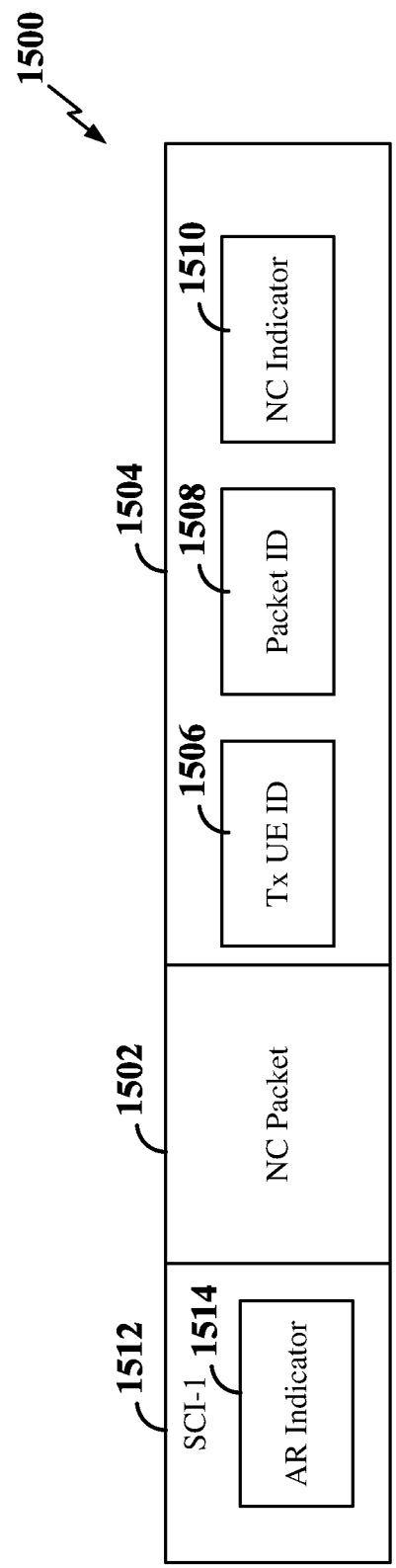
FIG. 15 is a diagram illustrating an exemplary network coded sidelink transmission including an accept request message according to some aspects.

FIG. 15 is a diagram illustrating an exemplary network coded sidelink transmission 1500 according to some aspects. The network coded sidelink transmission 1500 includes a network coded packet 1502 and an accept request message 1504. The network coded packet 1502 includes a function (e.g., XOR) of two or more packets retransmitted by a network coding device. The accept request message 1504 includes an identifier (e.g., a source ID or Tx UE ID) 1506 of the Tx UE that transmitted a packet to the network coding device including a network coding request flag requesting the network coding device perform retransmissions of the packet. In addition, the accept request message 1504 includes a packet identifier (ID) 1508 identifying the packet transmitted by the Tx UE. The accept request message 1504 further includes a network coding indicator (NC indicator) 1510 indicating whether the network coding device accepts performing retransmission(s) of the packet. In some examples, the network coded packet 1502 includes a retransmission of the packet associated with the accept request message 1504. In other examples, the network coded packet includes retransmissions of other packets. In this example, the NC indicator 1510 may indicate that the network coding device does not accept retransmission(s) of the packet.

In some examples, the accept request message 1504 may be transmitted within SCI-2, within a MAC-CE or a MAC header of the network coded sidelink transmission 1500. The network coded sidelink transmission 1500 may further include SCI-1 1512 including an accept request indicator (AR Indicator) 1514 indicating that the network coded sidelink transmission 1500 includes the accept request message 1504. In some examples, the AR indicator 1514 is a single bit that indicates whether or not the accept request message 1504 is included. In some examples, the AR indicator 1514 may be transmitted separately from the network coded sidelink transmission 1500 (e.g., within SCI-1 or SCI-2 of a different sidelink transmission).

Figure 16:
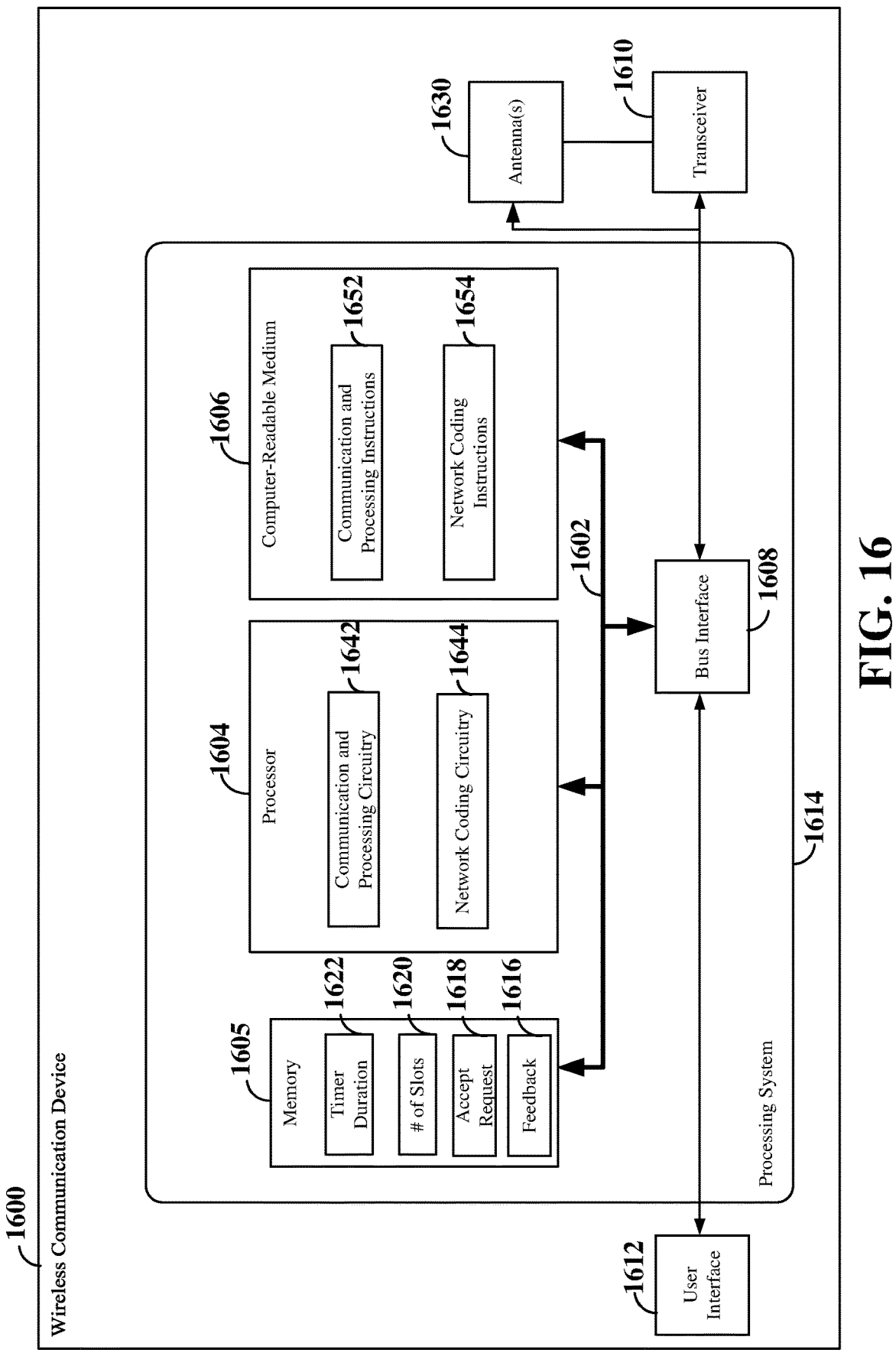
FIG. 16 is a block diagram illustrating an example of a hardware implementation for a wireless communication device employing a processing system according to some aspects.

FIG. 16 is a block diagram illustrating an example of a hardware implementation for a wireless communication device 1600 employing a processing system 1614. For example, the wireless communication device 1600 may correspond to a sidelink device, such as a V2X device, D2D device or other UE or wireless communication device configured for sidelink communication, as shown and described above in reference to FIGS. 1, 3, 6, 7, 9, 10, and/or 14.

The wireless communication device 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1600 may be configured to perform any one or more of the functions described herein. That is, the processor 1604, as utilized in the wireless communication device 1600, may be used to implement any one or more of the processes and procedures described below.

The processor 1604 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 links together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further.

A bus interface 1608 provides an interface between the bus 1602, a transceiver 1610, and one or more antennas 1630 (e.g., one or more antenna arrays or antenna panels). The transceiver 1610 provides a communication interface or a means for communicating with various other apparatus over a transmission medium (e.g., air interface) via the antenna(s) 1630. Depending upon the nature of the apparatus, a user interface 1612 (e.g., keypad, display, touch screen, speaker, microphone, control knobs, etc.) may also be provided. Of course, such a user interface 1612 is optional, and may be omitted in some examples.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. For example, the memory 1605 may store one or more of feedback information (Feedback) 1616, an accept request message (Accept Request) 1618, a number of slots (# of Slots) 1620, and/or a timer duration (Timer Duration) 1622, which may be used by the processor 1604 in generating and/or processing sidelink transmissions.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. In some examples, the computer-readable medium 1606 may be part of the memory 1605. Those skilled in the art will recognize how best to implement the described functionality presented throughout this disclosure depending on the particular application and the overall design constraints imposed on the overall system. In some examples, the computer-readable medium 1606 may be implemented on an article of manufacture, which may further include one or more other elements or circuits, such as the processor 1604 and/or memory 1605.

In some aspects of the disclosure, the processor 1604 may include circuitry configured for various functions. For example, the processor 1604 may include communication and processing circuitry 1642, configured to communicate with one or more sidelink devices (e.g., other UEs and/or a network coding device) via respective sidelinks (e.g., PC5 interfaces). In addition, the communication and processing circuitry 1642 may be configured to communicate with a network entity (e.g., a base station, such as s gNB or eNB) via a Uu link In some examples, the communication and processing circuitry 1642 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1642 may include one or more transmit/receive chains.

In some implementations where the communication involves receiving information, the communication and processing circuitry 1642 may obtain information from a component of the wireless communication device 1600 (e.g., from the transceiver 1610 that receives the information via radio frequency signaling or some other type of signaling suitable for the applicable communication medium), process (e.g., decode) the information, and output the processed information. For example, the communication and processing circuitry 1642 may output the information to another component of the processor 1604, to the memory 1605, or to the bus interface 1608. In some examples, the communication and processing circuitry 1642 may receive one or more of signals, messages, other information, or any combination thereof. In some examples, the communication and processing circuitry 1642 may receive information via one or more channels. In some examples, the communication and processing circuitry 1642 may include functionality for a means for receiving. In some examples, the communication and processing circuitry 1642 may include functionality for a means for processing, including a means for demodulating, a means for decoding, etc.

In some implementations where the communication involves sending (e.g., transmitting) information, the communication and processing circuitry 1642 may obtain information (e.g., from another component of the processor 1604, the memory 1605, or the bus interface 1608), process (e.g., modulate, encode, etc.) the information, and output the processed information. For example, the communication and processing circuitry 1642 may output the information to the transceiver 1610 (e.g., that transmits the information via radio frequency signaling or some other type of signaling suitable for the applicable communication medium). In some examples, the communication and processing circuitry 1642 may send one or more of signals, messages, other information, or any combination thereof. In some examples, the communication and processing circuitry 1642 may send information via one or more channels. In some examples, the communication and processing circuitry 1642 may include functionality for a means for sending (e.g., a means for transmitting). In some examples, the communication and processing circuitry 1642 may include functionality for a means for generating, including a means for modulating, a means for encoding, etc.

In some examples, the communication and processing circuitry 1642 may be configured to transmit an initial (first) sidelink transmission including a packet over a sidelink data channel to at least one receiving wireless communication device (e.g., a receiving UE) and a network coding device (e.g., which may be one of the receiving UEs) via the transceiver 1610. In some examples, the communication and processing circuitry 1642 may further be configured to transmit a network coding request flag associated with the packet in the initial sidelink transmission. For example, the network coding flag may be transmitted within SCI-1 of a PSCCH of the initial sidelink transmission, whereas the packet may be transmitted within a PSSCH of the initial sidelink transmission.

The communication and processing circuitry 1642 may further be configured to receive feedback information 1616 from the one or more receiving UEs (Rx UEs) and to store the feedback information 1616, for example within the memory 1605. The communication and processing circuitry 1642 may further be configured to receive the accept request message 1618 from the network coding device indicating whether the network coding device accepts performing retransmission(s) of the packet and to store the accept request message 1618, for example, within the memory 1605.

The communication and processing circuitry 1642 may further be configured to receive the number of slots 1620 and/or the timer duration 1622 from the network coding device and to store the number of slots 1620 and/or the timer duration 1622 within, for example, the memory 1605. In other examples, the number of slots 1620 and/or timer duration 1622 may be pre-configured on the wireless communication device or received from a base station.

The communication and processing circuitry 1642 may further be configured to receive a network coded sidelink transmission including a network coded packet from the network coding device. In some examples, the network coded sidelink transmission includes the accept request message. In this example, the network coded packet may include a retransmission of at least one additional packet. In some examples, the network coded packet further includes a retransmission of the packet associated with the accept request message. The accept request message may be included, for example, within SCI-2, a MAC-CE, or a MAC header of the network coded sidelink transmission. The communication and processing circuitry 1642 may further be configured to receive an accept request indicator from the network coding device that indicates that the network coded sidelink transmission includes the accept request message. For example, the accept request indicator may be included within SCI-1 of the network coded sidelink transmission or may be included in a different sidelink transmission (e.g., within SCI-1 or SCI-2 of the different sidelink transmission). The communication and processing circuitry 1642 may further be configured to execute communication and processing instructions (software) 1652 stored in the computer-readable medium 1606 to implement one or more of the functions described herein.

The processor 1604 may further include network coding circuitry 1644, configured to generate the network coding flag requesting the network coding device perform retransmission(s) of a packet and to monitor for the accept request message 1618 from the network coding device. The network coding circuitry 1644 may monitor for the accept request message 1618 at a second time different than a first time at which the communication and processing circuitry 1642 receives the feedback information 1616. In some examples, the network coding circuitry 1644 may utilize the number of slots 1620 to identify the second time at which the accept request message 1618 may be received. For example, the accept request message 1618 may be delayed with respect to the feedback information 1616 by the number of slots 1620 corresponding to a difference between the first time at which the feedback information 1616 is received and the second time at which the accept request message 1618 is received.

In some examples, the network coding circuitry 1644 may utilize the timer duration 1622 to identify the second time at which the accept request message 1618 may be received. For example, the accept request message 1618 may be sent in advance of or delayed with respect to the feedback information 1616 based on the timer duration 1622. The timer duration 1622 may correspond to a difference between a third time at which the communication and processing circuitry 1642 transmits the initial sidelink transmission including the packet and the second time at which the accept request message 1618 is received. In some examples, the accept request message 1618 is included in a combined accept request message that includes a combination of a plurality of accept request messages for a plurality of packets received by the network coding device during the timer duration 1622. In this example, the network coding circuitry 1644 may extract the accept request message 1618 associated with the packet from the combined accept request message.

In some examples, the network coding circuitry 1644 may be configured to extract the accept request message 1618 from a network coded sidelink transmission sent by the network coding device. The accept request message 1618 may include an identifier of the wireless communication device 1600, a packet identifier of the packet, and a network coding indicator indicating whether the network coding device accepts performing retransmission(s) of the packet. The network coding circuitry 1644 may further be configured to determine that the network coded sidelink transmission includes the accept request message 1618 based on the accept request indicator included in the network coded sidelink transmission (e.g., SCI-1 of the network coded sidelink transmission) or the different sidelink transmission. The network coding circuitry 1644 may further be configured to execute network coding instructions (software) 1654 stored in the computer-readable medium 1606 to implement one or more of the functions described herein.

Figure 17:
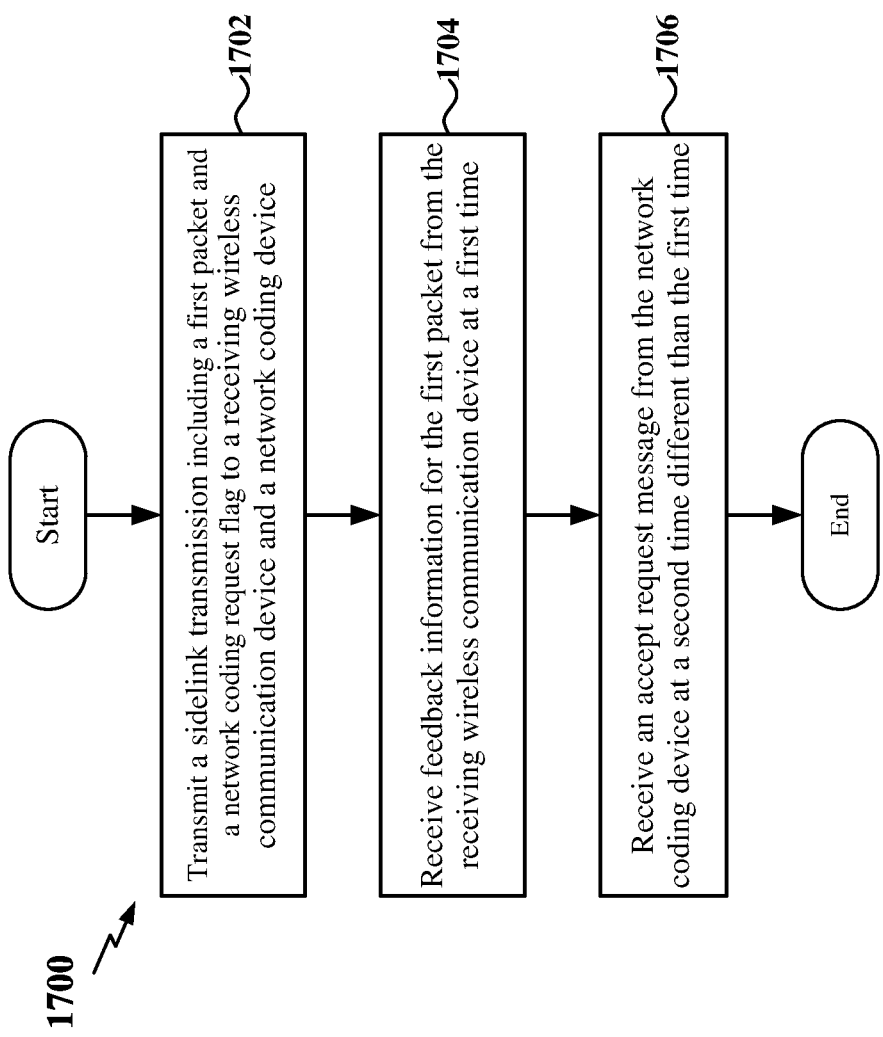
FIG. 17 is a flow chart of an exemplary method for receiving delayed accept request messages in network coding according to some aspects.

FIG. 17 is a flow chart of an exemplary method 1700 for receiving delayed accept request messages in network coding according to some aspects. As described below, some or all illustrated features may be omitted in a particular implementation within the scope of the present disclosure, and some illustrated features may not be required for implementation of all examples. In some examples, the method may be performed by the wireless communication device 1600, as described above and illustrated in FIG. 16, by a processor or processing system, or by any suitable means for carrying out the described functions.

At block 1702, the wireless communication device (e.g., a transmitting wireless communication device configured for sidelink communication) may transmit a sidelink transmission including a first packet and a network coding request flag to a receiving wireless communication device and a network coding device. The network coding request flag requests the network coding device perform one or more retransmissions of the first packet. For example, the communication and processing circuitry 1642, together with the network coding circuitry 1644 and transceiver 1610, shown and described above in connection with FIG. 16, may provide a means to transmit the sidelink transmission including the first packet and the network coding request flag.

At block 1704, the transmitting wireless communication device may receive feedback information for the first packet from the receiving wireless communication device at a first time. For example, the communication and processing circuitry 1642 and transceiver 1610, shown and described above in connection with FIG. 16, may provide a means to receive the feedback information at the first time.

At block 1706, the transmitting wireless communication device may receive an accept request message from the network coding device at a second time different than the first time. The accept request message indicates whether the network coding device accepts performing the one or more retransmissions of the first packet. In some examples, the accept request message is delayed with respect to the feedback information by a number of slots corresponding to a difference between the first time and the second time. In some examples, the transmitting wireless communication device may further receive the number of slots from the network coding device.

In some examples, the accept request message is transmitted based on a timer duration corresponding to a difference between a third time at which the sidelink transmission is transmitted and the second time. In some examples, the transmitting wireless communication device may receive the timer duration from the network coding device. In some examples, the transmitting wireless communication device may receive a combined accept request message at the second time that combines a plurality of accept request messages for a plurality of packets transmitted to the network coding device within the timer duration.

In some examples, the transmitting wireless communication device may receive a network coded sidelink transmission including the accept request message and a network coded packet that includes an additional retransmission of at least one additional packet. In some examples, the network coded packet further includes the retransmission of the first packet. In some examples, the accept request message is included within second stage sidelink control information (SCI-2), a medium access control (MAC) control element (MAC-CE), or a MAC header of the network coded sidelink transmission. In some examples, the transmitting wireless communication device may further receive an accept request indicator from the network coding device indicating that the network coded sidelink transmission includes the accept request message. In some examples, the accept request indicator is included within first stage sidelink control information (SCI-1) of the network coded sidelink transmission.

In some examples, the accept request message includes an identifier of the transmitting wireless communication device, a packet identifier of the first packet, and a network coding indicator indicating whether the network coding device accepts the retransmission of the first packet. For example, the communication and processing circuitry 1642, together with the network coding circuitry 1644 and transceiver 1610, shown and described above in connection with FIG. 16, may provide a means to receive the accept request message at the second time different than the first time.

In one configuration, the wireless communication device 1600 includes means for transmitting a sidelink transmission to a receiving wireless communication device and a network coding device, where the sidelink transmission includes a first packet and a network coding request flag requesting retransmission of the first packet by the network coding device. The wireless communication device 1600 further includes means for receiving feedback information for the first packet from the receiving wireless communication device at a first time and means for receiving an accept request message from the network coding device at a second time different than the first time, where the accept request message indicating whether the network coding device accepts the retransmission of the first packet. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 6, 7, 9, 10, and/or 14, and utilizing, for example, the processes and/or algorithms described herein in relation to FIGS. 10-14, and/or 17.

Figure 18:
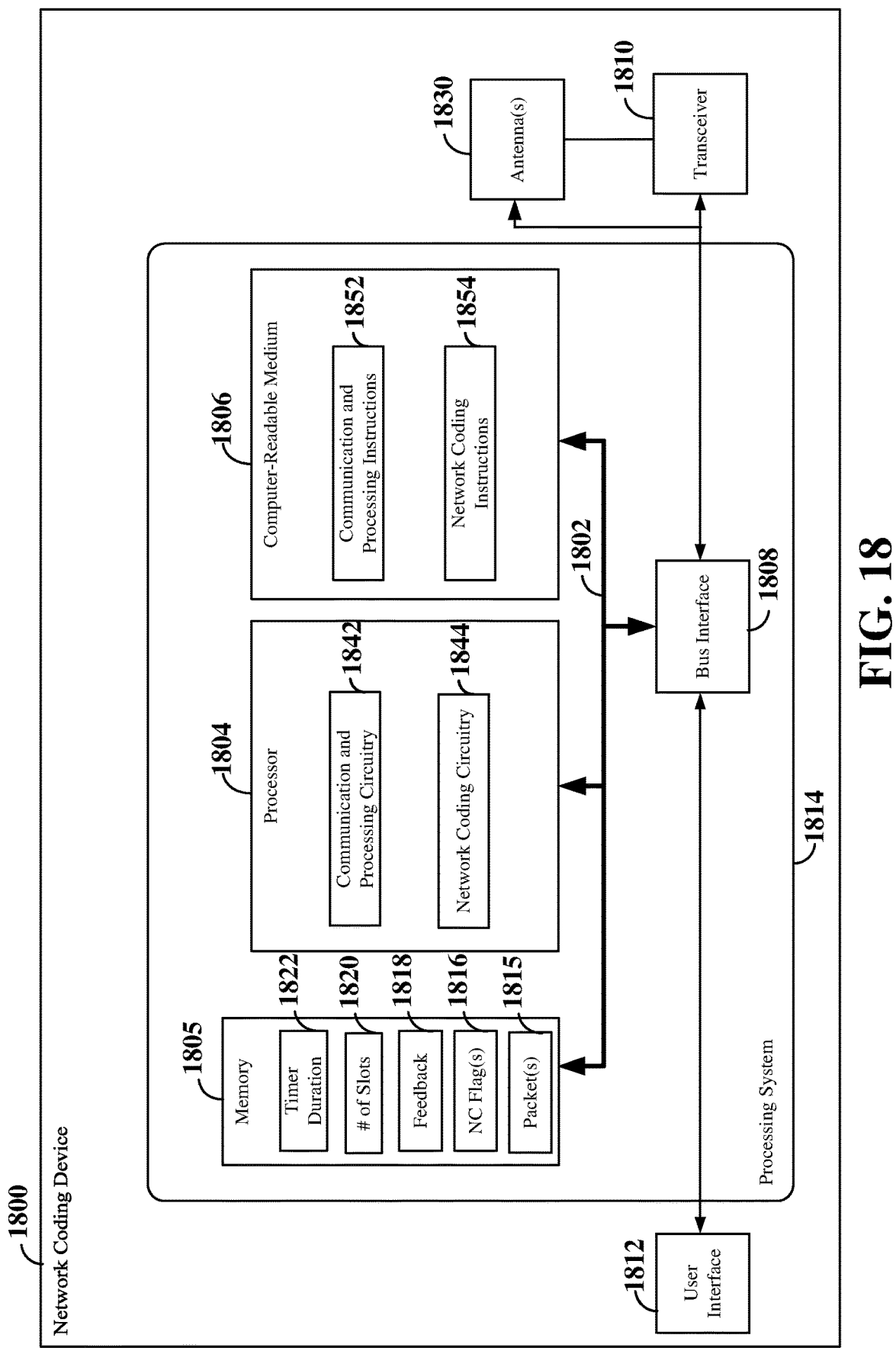
FIG. 18 is a block diagram illustrating an example of a hardware implementation for a network coding device employing a processing system according to some aspects.

FIG. 18 is a conceptual diagram illustrating an example of a hardware implementation for an exemplary network coding device 1800 employing a processing system 1814. For example, the network coding device 1800 may correspond to a wireless communication device (e.g., a sidelink device, such as a V2X device, D2D device, RSU, or other UE or wireless communication device configured for sidelink communication) or a base station (e.g., gNB) illustrated in any one or more of FIGS. 1, 3, 6, 7, 9, 10, and/or 14.

In accordance with various aspects of the disclosure, an element, or any portion of an element, or any combination of elements may be implemented with a processing system 1814 that includes one or more processors 1804. The processing system 1814 may be substantially the same as the processing system 1614 illustrated in FIG. 16, including a bus interface 1808, a bus 1802, memory 1805, a processor 1804, and a computer-readable medium 1806. For example, the memory 1805 may store one or more packets (Packet(s)) 1815, one or more network coding flags (NC Flag(s)) 1816, feedback information (Feedback) 1818, a number of slots (#of Slots) 1820, and a timer duration (Timer Duration) 1822, which may be used by the processor 1804 in generating and/or processing sidelink transmissions. Furthermore, the network coding device 1800 may include an optional user interface 1812, a transceiver 1810, and antenna(s) 1830 substantially similar to those described above in FIG. 16. The processor 1804, as utilized in a network coding device 1800, may be used to implement any one or more of the processes described below. In some examples, the computer-readable medium 1806 may be implemented on an article of manufacture, which may further include one or more other elements or circuits, such as the processor 1804 and/or memory 1805.

In some aspects of the disclosure, the processor 1804 may include circuitry configured for various functions. For example, the processor 1804 may include communication and processing circuitry 1842, configured to communicate with one or more wireless communication devices (e.g., UEs) via respective sidelinks (e.g., PC5 interfaces) and/or access (e.g., Uu) links The communication and processing circuitry 1842 may further be configured to communicate with a base station via one or more access (e.g., Uu) links In some examples, the communication and processing circuitry 1842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1842 may include one or more transmit/receive chains.

In some implementations where the communication involves receiving information, the communication and processing circuitry 1842 may obtain information from a component of the network coding device 1800 (e.g., from the transceiver 1810 that receives the information via radio frequency signaling or some other type of signaling suitable for the applicable communication medium), process (e.g., decode) the information, and output the processed information. For example, the communication and processing circuitry 1842 may output the information to another component of the processor 1804, to the memory 1805, or to the bus interface 1808. In some examples, the communication and processing circuitry 1842 may receive one or more of signals, messages, other information, or any combination thereof. In some examples, the communication and processing circuitry 1842 may receive information via one or more channels. In some examples, the communication and processing circuitry 1842 may include functionality for a means for receiving. In some examples, the communication and processing circuitry 1842 may include functionality for a means for processing, including a means for demodulating, a means for decoding, etc.

In some implementations where the communication involves sending (e.g., transmitting) information, the communication and processing circuitry 1842 may obtain information (e.g., from another component of the processor 1804, the memory 1805, or the bus interface 1808), process (e.g., modulate, encode, etc.) the information, and output the processed information. For example, the communication and processing circuitry 1842 may output the information to the transceiver 1810 (e.g., that transmits the information via radio frequency signaling or some other type of signaling suitable for the applicable communication medium). In some examples, the communication and processing circuitry 1842 may send one or more of signals, messages, other information, or any combination thereof. In some examples, the communication and processing circuitry 1842 may send information via one or more channels. In some examples, the communication and processing circuitry 1842 may include functionality for a means for sending (e.g., a means for transmitting). In some examples, the communication and processing circuitry 1842 may include functionality for a means for generating, including a means for modulating, a means for encoding, etc.

In some examples, the communication and processing circuitry 1842 may be configured to receive a first sidelink transmission transmitted from a first transmitting wireless communication device to one or more receiving wireless communication devices via the transceiver 1810. The first sidelink transmission may include a first packet 1815 transmitted over a sidelink data channel (e.g., a PSSCH). The first sidelink transmission may further include a first network coding request flag 1816 requesting the network coding device 1800 perform one or more retransmissions of the first packet 1815. The communication and processing circuitry 1842 may be configured to store the first packet 1815 and the first network coding request flag 1816 within, for example, memory 1805.

The communication and processing circuitry 1842 may further be configured to receive feedback information 1818 for the first packet from the one or more receiving wireless communication devices via the transceiver 1810. In some examples, the communication and processing circuitry 1842 may receive the feedback information 1818 at a first time.

The communication and processing circuitry 1842 may further be configured to transmit a first accept request message to the first transmitting wireless communication device indicating whether the network coding device 1800 accepts performing retransmission(s) of the first packet 1815 via the transceiver 1810. The communication and processing circuitry 1842 may be configured to transmit the first accept request message at a second time different than the first time. In some examples, a difference between the first time and the second time may correspond to the number of slots 1820. In this example, the communication and processing circuitry 1842 may further be configured to transmit the number of slots 1820 to the first transmitting wireless communication device.

In some examples, the communication and processing circuitry 1842 may transmit the first accept request message at the second time upon expiration of a timer initiated with the timer duration 1822 upon receipt of the first sidelink transmission. In this example, the communication and processing circuitry 1842 may further be configured to transmit the timer duration 1822 of the timer to the first transmitting wireless communication device. In some examples, the communication and processing circuitry 1842 may receive a plurality of sidelink transmissions including the first sidelink transmission prior to expiration of the timer. Each of the plurality of sidelink transmissions can include a respective one of a plurality of packets 1815 and a respective one of a plurality of network coding request flags 1816, each of which may be stored, for example, in memory 1805. In this example, the communication and processing circuitry 1842 may be configured to transmit a combined accept request message combining a plurality of accept request messages including the first accept request message to at least the first transmitting wireless communication device upon expiration of the timer. In examples in which the plurality of packets are received from multiple, different transmitting wireless communication devices, the communication and processing circuitry 1842 may groupcast or multicast the combined accept request message to the multiple transmitting wireless communication devices.

The communication and processing circuitry 1842 may further be configured to retransmit the packet to the one or more receiving wireless communication devices as a network coded sidelink transmission based on the network coding request flag via the transceiver 1810. In some examples, the communication and processing circuitry 1842 may be configured to retransmit the packet and one or more additional packets as the network coded sidelink transmission.

In some examples, the communication and processing circuitry 1842 may be configured to transmit a network coded sidelink transmission including the first accept request message and a network coded packet including at least an additional retransmission of an additional packet via the transceiver 1810. In some examples, the network coded packet further includes the retransmission of the first packet. In some examples, the first accept request message is included within second stage sidelink control information (SCI-2), a medium access control (MAC) control element (MAC-CE), or a MAC header of the network coded sidelink transmission. In some examples, the communication and processing circuitry 1842 may further be configured to transmit an accept request indicator to the first transmitting wireless communication device indicating that the network coded sidelink transmission includes the first accept request message via the transceiver 1810. In some examples, the accept request indicator is included within first stage sidelink control information (SCI-1) of the network coded sidelink transmission or within a different sidelink transmission (e.g., within SCI-1 or SCI-2 of the different sidelink transmission). The communication and processing circuitry 1842 may further be configured to execute communication and processing instructions (software) 1852 stored in the computer-readable medium 1806 to implement one or more of the functions described herein.

The processor 1804 may further include network coding circuitry 1844, configured to generate the first accept request message for the first transmitting wireless communication device and to delay transmission of the first accept request message from the first time at which the feedback information 1818 for the first packet 1815 is received to the second time. In some examples, the network coding circuitry 1844 may be configured to delay transmission of the first accept request message by the number of slots 1820. In some examples, the network coding circuitry 1844 may be configured to determine the number of slots based on at least one of a priority of the first packet or a packet delay budget associated with the first packet.

In some examples, the network coding circuitry 1844 may be configured to delay transmission of the first accept request message based on the timer duration 1822 of the timer. For example, the network coding circuitry 1844 may be configured to set the timer upon receipt of the first sidelink transmission and to instruct the communication and processing circuitry 1842 to transmit the first accept request message upon expiration of the timer. In some examples, the network coding circuitry 1844 may be configured to determine the timer duration 1822 based on at least one of a priority of the first packet or a packet delay budget associated with the first packet.

In some examples, the network coding circuitry 1844 may be configured to generate the plurality of accept request messages including the first accept request message for the plurality of packets including the first packet received during the timer duration 1822. The network coding circuitry 1844 may further be configured to combine the plurality of accept request messages to produce the combined accept request message.

In some examples, the network coding circuitry 1844 may be configured to generate the network coded sidelink transmission including the first accept request message and the network coded packet including at least the additional retransmission of the additional packet. In some examples, the network coding circuitry 1844 may generate the network coded packet further including the retransmission of the first packet. For example, the network coding circuitry 1844 may include the retransmission of the first packet 1815 in the network coded packet in response to accepting retransmission(s) of the first packet 1815. In some examples, the network coding circuitry 1844 may utilize the feedback information 1818 in generating the network coded packet.

In some examples, the first accept request message may include an identifier of the first transmitting wireless communication device, a packet identifier of the first packet 1815, and a network coding indicator indicating whether the network coding device 1800 accepts the retransmission of the first packet. The network coding circuitry 1844 may further be configured to generate the accept request indicator and to include the accept request indicator within SCI-1 of the network coded sidelink transmission or within a different sidelink transmission. The network coding circuitry 1844 may further be configured to execute network coding instructions (software) 1854 stored in the computer-readable medium 1806 to implement one or more of the functions described herein.

Figure 19:
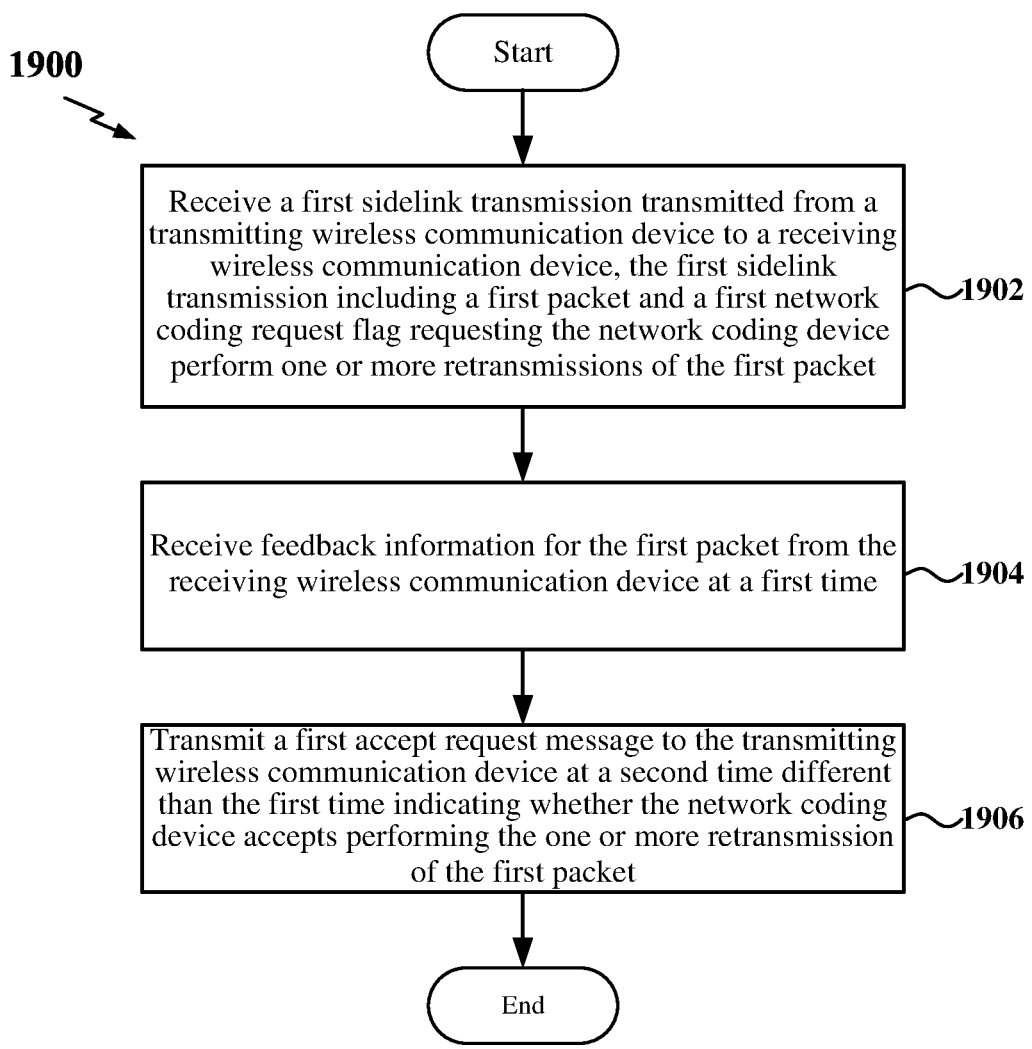
FIG. 19 is a flow chart of an exemplary method for delaying accept request messages in network coding according to some aspects.

FIG. 19 is a flow chart of an exemplary method 1900 for network coding according to some aspects. As described below, some or all illustrated features may be omitted in a particular implementation within the scope of the present disclosure, and some illustrated features may not be required for implementation of all examples. In some examples, the method may be performed by the network coding device 1800, as described above and illustrated in FIG. 18, by a processor or processing system, or by any suitable means for carrying out the described functions.

At block 1902, the network coding device (e.g., a roadside unit (RSU), another wireless communication device, or a base station) may receive a first sidelink transmission transmitted from a transmitting wireless communication device to a receiving wireless communication device. The first sidelink transmission includes a first packet and a first network coding request flag requesting the network coding device perform one or more retransmissions of the first packet. For example, the communication and processing circuitry 1842 and transceiver 1810 shown and described above in connection with FIG. 18 may provide a means to receive the first sidelink transmission.

At block 1904, the network coding device may receive feedback information for the first packet from the receiving wireless communication device at a first time. For example, the communication and processing circuitry 1842 and transceiver 1810, shown and described above in connection with FIG. 18, may provide a means to receive the feedback information.

At block 1906, the network coding device may transmit a first accept request message to the transmitting wireless communication device at a second time different than the first time indicating whether the network coding device accepts performing the one or more retransmissions of the first packet. In some examples, the network coding device may delay transmission of the first accept request message by a number of slots corresponding to a difference between the first time and the second time. In some examples, the number of slots is based on at least one of a priority of the first packet or a packet delay budget associated with the first packet. In some examples, the network coding device may further transmit the number of slots to the transmitting wireless communication device.

In some examples, the network coding device may set a timer upon receipt of the first sidelink transmission and transmit the first accept request message upon expiration of the timer. In some examples, a timer duration of the timer is based on at least one of a priority of the first packet or a packet delay budget associated with the first packet. In some examples, the network coding device may further transmit the timer duration of the timer to the transmitting wireless communication device. In some examples, the network coding device may receive a plurality of sidelink transmissions including the first sidelink transmission prior to expiration of the timer. Each of the plurality of sidelink transmissions includes a respective one of a plurality of packets and a respective one of a plurality of network coding request flags. In some examples, the network coding device may further combine a plurality of accept request messages including the first accept request message to produce a combined accept request message for the plurality of packets. The network coding device may further transmit the combined accept request message to at least the transmitting wireless communication device upon expiration of the timer.

In some examples, the network coding device may transmit a network coded sidelink transmission including the first accept request message and a network coded packet including at least an additional retransmission of an additional packet. In some examples, the network coded packet further includes the retransmission of the first packet. In some examples, the network coding device may include the first accept request message within second stage sidelink control information (SCI-2), a medium access control (MAC) control element (MAC-CE), or a MAC header of the network coded sidelink transmission. In some examples, the network coding device may transmit an accept request indicator to the transmitting wireless communication device. The accept request indicator indicates that the network coded sidelink transmission comprises the first accept request message. In some examples, the accept request message is included within first stage sidelink control information (SCI-1) of the network coded sidelink transmission. For example, the communication and processing circuitry 1842, together with the network coding circuitry 1844 and transceiver 1810 shown and described above in connection with FIG. 18 may provide a means to transmit the first accept request message.

In one configuration, the network coding device 1800 includes means for receiving a first sidelink transmission transmitted from a transmitting wireless communication device to a receiving wireless communication device, where the first sidelink transmission includes a first packet and a first network coding request flag requesting retransmission of the first packet by the network coding device, as described in the present disclosure. The network coding device 1800 further includes means for receiving feedback information for the first packet from the receiving wireless communication device at a first time and means for transmitting a first accept request message to the transmitting wireless communication device at a second time different than the first time, where the first accept request message indicates whether the network coding device accepts the retransmission of the first packet. In one aspect, the aforementioned means may be the processor 1804 shown in FIG. 18 configured to perform the functions recited by the aforementioned means. In another aspect, the aforementioned means may be a circuit or any apparatus configured to perform the functions recited by the aforementioned means.

Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the FIGS. 1, 3, 6, 8, 9, 10 and/or 14, and utilizing, for example, the processes and/or algorithms described herein in relation to FIGS. 10-14, and 19.

The processes shown in FIGS. 10-14, 17, and 19 may include additional aspects, such as any single aspect or any combination of aspects described below and/or in connection with one or more other processes described elsewhere herein.

Aspect 1: A method for wireless communication at a network coding device, the method comprising: receiving a first sidelink transmission transmitted from a transmitting wireless communication device to a receiving wireless communication device, the first sidelink transmission comprising a first packet and a first network coding request flag requesting retransmission of the first packet by the network coding device; receiving feedback information for the first packet from the receiving wireless communication device at a first time; and transmitting a first accept request message to the transmitting wireless communication device at a second time different than the first time, the first accept request message indicating whether the network coding device accepts the retransmission of the first packet.

Aspect 2: The method of aspect 1, further comprising: delaying transmission of the first accept request message by a number of slots corresponding to a difference between the first time and the second time.

Aspect 3: The method of aspect 2, wherein the number of slots is based on at least one of a priority of the first packet or a packet delay budget associated with the first packet.

Aspect 4: The method of aspect 2 or 3, further comprising: transmitting the number of slots to the transmitting wireless communication device.

Aspect 5: The method of aspect 1, further comprising: setting a timer upon receipt of the first sidelink transmission, and wherein the transmitting the first accept request message further comprises: transmitting the first accept request message upon expiration of the timer.

Aspect 6: The method of aspect 5, further comprising: receiving a plurality of sidelink transmissions including the first sidelink transmission prior to expiration of the timer, each of the plurality of sidelink transmissions comprising a respective one of a plurality of packets and a respective one of a plurality of network coding request flags; combining a plurality of accept request messages including the first accept request message to produce a combined accept request message for the plurality of packets; and transmitting the combined accept request message to at least the transmitting wireless communication device upon expiration of the timer.

Aspect 7: The method of aspect 5 or 6, wherein a timer duration of the timer is based on at least one of a priority of the first packet or a packet delay budget associated with the first packet.

Aspect 8: The method of any of aspects 5 through 7, further comprising: transmitting a timer duration of the timer to the transmitting wireless communication device.

Aspect 9: The method of aspect 1, wherein the transmitting the accept request message further comprises: transmitting a network coded sidelink transmission comprising the first accept request message and a network coded packet comprising at least an additional retransmission of an additional packet.

Aspect 10: The method of aspect 9, further comprising: including the first accept request message within second stage sidelink control information (SCI-2), a medium access control (MAC) control element (MAC-CE), or a MAC header of the network coded sidelink transmission.

Aspect 11: The method of aspect 9 or 10, wherein the first accept request message comprises an identifier of the transmitting wireless communication device, a packet identifier of the first packet, and a network coding indicator indicating whether the network coding device accepts the retransmission of the first packet.

Aspect 12: The method of any of aspects 9 through 11, further comprising: transmitting an accept request indicator to the transmitting wireless communication device, the accept request indicator indicating that the network coded sidelink transmission comprises the first accept request message.

Aspect 13: The method of aspect 12, wherein the accept request indicator is included within first stage sidelink control information (SCI-1) of the network coded sidelink transmission.

Aspect 14: The method of any of aspects 9 through 13, wherein the network coded packet further comprises the retransmission of the first packet.

Aspect 15: A network coding device comprising a transceiver, a memory, and a processor coupled to the transceiver and the memory, the processor and the memory configured to perform a method of any one of aspects 1 through 14.

Aspect 16: A network coding device comprising means for performing a method of any one of aspects 1 through 14.

Aspect 17: A non-transitory computer-readable medium having stored therein instructions executable by one or more processors of a network coding device to perform a method of any one of examples 1 through 14.

Aspect 18: A method for wireless communication at a transmitting wireless communication device, the method comprising: transmitting a sidelink transmission to a receiving wireless communication device and a network coding device, the sidelink transmission comprising a first packet and a network coding request flag requesting retransmission of the first packet by the network coding device; receiving feedback information for the first packet from the receiving wireless communication device at a first time; and receiving an accept request message from the network coding device at a second time different than to the first time, the accept request message indicating whether the network coding device accepts the retransmission of the first packet.

Aspect 19: The method of aspect 18, wherein the accept request message is delayed with respect to the feedback information by a number of slots corresponding to a difference between the first time and the second time.

Aspect 20: The method of aspect 18 or 19, further comprising: receiving the number of slots from the network coding device.

Aspect 21: The method of aspect 18, wherein the accept request message is received based on a timer duration corresponding to a difference between a third time at which the sidelink transmission is transmitted and the second time.

Aspect 22: The method of aspect 21, wherein the receiving the accept request message further comprises: receiving a combined accept request message at the second time that combines a plurality of accept request messages for a plurality of packets transmitted to the network coding device within the timer duration.

Aspect 23: The method of aspect 21 or 22, further comprising: receiving the timer duration from the network coding device.

Aspect 24: The method of aspect 18, wherein the receiving the accept request message further comprises: receiving a network coded sidelink transmission comprising the accept request message and a network coded packet comprising an additional retransmission of at least one additional packet.

Aspect 25: The method of aspect 24, wherein the accept request message is included within second stage sidelink control information (SCI-2), a medium access control (MAC) control element (MAC-CE), or a MAC header of the network coded sidelink transmission.

Aspect 26: The method of aspect 24 or 25, wherein the accept request message comprises an identifier of the transmitting wireless communication device, a packet identifier of the first packet, and a network coding indicator indicating whether the network coding device accepts the retransmission of the first packet.

Aspect 27: The method of any of aspects 24 through 26, further comprising: receiving an accept request indicator from the network coding device, the accept request indicator indicating that the network coded sidelink transmission comprises the accept request message.

Aspect 28: The method of aspect 27, wherein the accept request indicator is included within first stage sidelink control information (SCI-1) of the network coded sidelink transmission.

Aspect 29: The method of any of aspects 24 through 28, wherein the network coded packet further comprises the retransmission of the first packet.

Aspect 30: A transmitting wireless communication device comprising a transceiver, a memory, and a processor coupled to the transceiver and the memory, the processor and the memory configured to perform a method of any one of aspects 18 through 29.

Aspect 31: A transmitting wireless communication device comprising means for performing a method of any one of aspects 18 through 29.

Aspect 32: A non-transitory computer-readable medium having stored therein instructions executable by one or more processors of a transmitting wireless communication device to perform a method of any one of examples 18 through 29.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 6, 7, 9-14, 16, and/or 18 may be configured to perform one or more of the methods, features, or steps described herein. The novel algorithms described herein may also be efficiently implemented in software and/or be embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network coding device, comprising:
a transceiver;
a memory; and
a processor coupled to the transceiver and the memory, wherein the processor and the memory are configured to:
receive a first sidelink transmission transmitted from a transmitting wireless communication device to a receiving wireless communication device via the transceiver, the first sidelink transmission comprising a first packet and a first network coding request flag requesting the network coding device perform one or more retransmissions of the first packet;
receive feedback information for the first packet from the receiving wireless communication device at a first time via the transceiver;
transmit a first accept request message to the transmitting wireless communication device at a second time different than the first time via the transceiver, the first accept request message indicating whether the network coding device accepts performing the one or more retransmissions of the first packet; and
delay transmission of the first accept request message by a number of slots corresponding to a difference between the first time and the second time.

2. The network coding device of claim 1, wherein the number of slots is based on at least one of a priority of the first packet or a packet delay budget associated with the first packet.

3. The network coding device of claim 1, wherein the processor and the memory are further configured to:
transmit the number of slots to the transmitting wireless communication device.

4. A network coding device, comprising:
a transceiver;
a memory; and
a processor coupled to the transceiver and the memory, wherein the processor and the memory are configured to:
receive a first sidelink transmission transmitted from a transmitting wireless communication device to a receiving wireless communication device via the transceiver, the first sidelink transmission comprising a first packet and a first network coding request flag requesting the network coding device perform one or more retransmissions of the first packet;
receive feedback information for the first packet from the receiving wireless communication device at a first time via the transceiver;
transmit a first accept request message to the transmitting wireless communication device at a second time different than the first time via the transceiver, the first accept request message indicating whether the network coding device accepts performing the one or more retransmissions of the first packet; and
set a timer upon receipt of the first sidelink transmission; and
transmit the first accept request message upon expiration of the timer.

5. The network coding device of claim 4, wherein the processor and the memory are further configured to:
receive a plurality of sidelink transmissions including the first sidelink transmission prior to expiration of the timer, each of the plurality of sidelink transmissions comprising a respective one of a plurality of packets and a respective one of a plurality of network coding request flags;
combine a plurality of accept request messages including the first accept request message to produce a combined accept request message for the plurality of packets; and
transmit the combined accept request message to at least the transmitting wireless communication device upon expiration of the timer.

6. The network coding device of claim 4, wherein a timer duration of the timer is based on at least one of a priority of the first packet or a packet delay budget associated with the first packet.

7. The network coding device of claim 4, wherein the processor and the memory are further configured to:
transmit a timer duration of the timer to the transmitting wireless communication device.

8. A network coding device, comprising:
a transceiver;
a memory; and
a processor coupled to the transceiver and the memory, wherein the processor and the memory are configured to:
receive a first sidelink transmission transmitted from a transmitting wireless communication device to a receiving wireless communication device via the transceiver, the first sidelink transmission comprising a first packet and a first network coding request flag requesting the network coding device perform one or more retransmissions of the first packet;
receive feedback information for the first packet from the receiving wireless communication device at a first time via the transceiver;
transmit a first accept request message to the transmitting wireless communication device at a second time different than the first time via the transceiver, the first accept request message indicating whether the network coding device accepts performing the one or more retransmissions of the first packet; and
transmit a network coded sidelink transmission comprising the first accept request message and a network coded packet comprising at least an additional retransmission of an additional packet.

9. The network coding device of claim 8, wherein the processor and the memory are further configured to:
include the first accept request message within second stage sidelink control information (SCI-2), a medium access control (MAC) control element (MAC-CE), or a MAC header of the network coded sidelink transmission.

10. The network coding device of claim 8, wherein the first accept request message comprises an identifier of the transmitting wireless communication device, a packet identifier of the first packet, and a network coding indicator indicating whether the network coding device accepts performing the one or more retransmissions of the first packet.

11. The network coding device of claim 8, wherein the processor and the memory are further configured to:
transmit an accept request indicator to the transmitting wireless communication device, the accept request indicator indicating that the network coded sidelink transmission comprises the first accept request message.

12. The network coding device of claim 11, wherein the accept request indicator is included within first stage sidelink control information (SCI-1) of the network coded sidelink transmission.

13. The network coding device of claim 8, wherein the network coded packet further comprises a retransmission of the one or more retransmissions of the first packet.

14. A method for wireless communication at a network coding device, the method comprising:
- receiving a first sidelink transmission transmitted from a transmitting wireless communication device to a receiving wireless communication device, the first sidelink transmission comprising a first packet and a first network coding request flag requesting the network coding device perform one or more retransmissions of the first packet;
- receiving feedback information for the first packet from the receiving wireless communication device at a first time;
- transmitting a first accept request message to the transmitting wireless communication device at a second time different than the first time, the first accept request message indicating whether the network coding device accepts performing the one or more retransmissions of the first packet; and
- delaying transmission of the first accept request message by a number of slots corresponding to a first difference between the first time and the second time or based on a timer duration corresponding to a second difference between a third time at which the first sidelink transmission is received and the second time.

15. The method of claim 14, wherein the number of slots is based on at least one of a priority of the first packet or a packet delay budget associated with the first packet.

16. The method of claim 14, further comprising:
- transmitting the number of slots to the transmitting wireless communication device.

17. The method of claim 14, further comprising:
- setting a timer having the timer duration upon receipt of the first sidelink transmission; and
- transmitting the first accept request message upon expiration of the timer.

18. The method of claim 17, further comprising:
- receiving a plurality of sidelink transmissions including the first sidelink transmission prior to expiration of the timer, each of the plurality of sidelink transmissions comprising a respective one of a plurality of packets and a respective one of a plurality of network coding request flags;
- combining a plurality of accept request messages including the first accept request message to produce a combined accept request message for the plurality of packets; and
- transmitting the combined accept request message to at least the transmitting wireless communication device upon expiration of the timer.

19. The method of claim 17, wherein the timer duration of the timer is based on at least one of a priority of the first packet or a packet delay budget associated with the first packet.

20. The method of claim 17, further comprising:
- transmitting the timer duration of the timer to the transmitting wireless communication device.

21. A method for wireless communication at a network coding device, the method comprising:
- receiving a first sidelink transmission transmitted from a transmitting wireless communication device to a receiving wireless communication device, the first sidelink transmission comprising a first packet and a first network coding request flag requesting the network coding device perform one or more retransmissions of the first packet;
- receiving feedback information for the first packet from the receiving wireless communication device at a first time;
- transmitting a first accept request message to the transmitting wireless communication device at a second time different than the first time, the first accept request message indicating whether the network coding device accepts performing the one or more retransmissions of the first packet; and
- transmitting a network coded sidelink transmission comprising the first accept request message and a network coded packet comprising at least an additional retransmission of an additional packet.

22. The method of claim 21, further comprising:
- including the first accept request message within second stage sidelink control information (SCI-2), a medium access control (MAC) control element (MAC-CE), or a MAC header of the network coded sidelink transmission.

23. The method of claim 21, wherein the first accept request message comprises an identifier of the transmitting wireless communication device, a packet identifier of the first packet, and a network coding indicator indicating whether the method accepts performing the one or more retransmissions of the first packet.

24. The method of claim 21, further comprising:
- transmitting an accept request indicator to the transmitting wireless communication device, the accept request indicator indicating that the network coded sidelink transmission comprises the first accept request message.

25. The method of claim 24, wherein the accept request indicator is included within first stage sidelink control information (SCI-1) of the network coded sidelink transmission.

26. The method of claim 21, wherein the network coded packet further comprises a retransmission of the one or more retransmissions of the first packet.

27. A network coding device, comprising:
- means for receiving a first sidelink transmission transmitted from a transmitting wireless communication device to a receiving wireless communication device, the first sidelink transmission comprising a first packet and a first network coding request flag requesting the network coding device perform one or more retransmissions of the first packet;
- means for receiving feedback information for the first packet from the receiving wireless communication device at a first time; means for transmitting a first accept request message to the transmitting wireless communication device at a second time different than the first time, the first accept request message indicating whether the network coding device accepts performing the one or more retransmissions of the first packet; and
- means for delaying transmission of the first accept request message by a number of slots corresponding to a first difference between the first time and the second time or based on a timer duration corresponding to a second difference between a third time at which the first sidelink transmission is received and the second time.

* * * * *